US012529245B2

(12) United States Patent
Tartal et al.

(10) Patent No.: US 12,529,245 B2
(45) **Date of Patent: *Jan. 20, 2026**

(54) ELECTRONIC LOCK

(71) Applicant: United States Postal Service, Washington, DC (US)

(72) Inventors: William Albert Tartal, Baltimore, MD (US); Gabriel Michael Yessin, Baltimore, MD (US)

(73) Assignee: United States Postal Service, Washington, DC (US)

( * ) Notice: Subject to any disclaimer, the term of this patent is extended or adjusted under 35 U.S.C. 154(b) by 247 days.

This patent is subject to a terminal disclaimer.

(21) Appl. No.: 18/169,082

(22) Filed: Feb. 14, 2023

(65) Prior Publication Data

US 2023/0203846 A1 Jun. 29, 2023

Related U.S. Application Data

(60) Continuation of application No. 16/887,537, filed on May 29, 2020, now Pat. No. 11,732,506, which is a (Continued)

(51) Int. Cl.
*E05B 47/00* (2006.01)
*A47G 29/14* (2006.01)
(Continued)

(52) U.S. Cl.
CPC ........ *E05B 47/0603* (2013.01); *A47G 29/141* (2013.01); *A47G 29/20* (2013.01); (Continued)

(58) Field of Classification Search
CPC ............. Y10T 292/68; Y10T 292/1021; Y10T 292/1097; Y10T 70/7028; Y10T 70/7051; (Continued)

(56) References Cited

U.S. PATENT DOCUMENTS 3,889,501 A 6/1975 Fort
4,789,859 A 12/1988 Clarkson et al.
(Continued)

FOREIGN PATENT DOCUMENTS

CN 101573502 A 11/2009
CN 107724814 A 2/2018
(Continued)

OTHER PUBLICATIONS

International Search Report & Written Opinion dated Sep. 25, 2018 in International Application No. PCT/US2018/037159 filed Jun. 12, 2018.

(Continued)

*Primary Examiner* — Suzanne L Barrett
(74) *Attorney, Agent, or Firm* — Knobbe, Martens, Olson & Bear, LLP

(57) ABSTRACT

A lock can include a motor assembly, a gear assembly, and an unlocking assembly. The motor assembly can include a motor and a drive shaft. The gear assembly can include a cam, a pinion gear, and a pinion. The pinion gear can include a plurality of teeth disposed along only a portion of a perimeter of the pinion gear. The pinion gear can be configured to engage the pinion. The pinion can be configured to translate laterally to release a biasing member to unlock a door of a container.

11 Claims, 16 Drawing Sheets

Related U.S. Application Data division of application No. 16/412,132, filed on May 14, 2019, now Pat. No. 11,313,152.

(60) Provisional application No. 62/671,848, filed on May 15, 2018.

(51) Int. Cl.

| | |
|---|---|
| ***A47G 29/20*** | (2006.01) |
| ***E05B 47/06*** | (2006.01) |
| ***E05B 65/06*** | (2006.01) |
| ***G07C 9/00*** | (2020.01) |

(52) U.S. Cl.

CPC .......... *E05B 47/0012* (2013.01); *E05B 65/06* (2013.01); *G07C 9/00563* (2013.01); *A47G 2029/146* (2013.01); *A47G 2029/149* (2013.01); *E05B 2047/0017* (2013.01); *E05B 2047/002* (2013.01); *E05B 2047/0021* (2013.01); *E05B 2047/0084* (2013.01); *E05B 2047/0095* (2013.01)

(58) Field of Classification Search

CPC ............. Y10T 70/7062; Y10T 70/7068; Y10T 70/7073; Y10T 70/7113; Y10T 70/7107; Y10T 70/5681; E05B 47/00; E05B 65/02; E05B 17/00; G06Q 50/32; G07C 9/00; G06F 21/44

USPC ............ 70/270–283, 190; 292/144, 244, 340

See application file for complete search history.

(56) References Cited

U.S. PATENT DOCUMENTS

| | | | | |
|---|---|---|---|---|
| 5,140,317 | A | 8/1992 | Hyatt, Jr. et al. | |
| 5,219,386 | A | 6/1993 | Kletzmaier et al. | |
| 5,272,894 | A | 12/1993 | Stillwagon | |
| 6,005,487 | A | 12/1999 | Hyatt, Jr. et al. | |
| 7,710,245 | B2 | 5/2010 | Pickering | |
| 8,791,804 | B2 | 7/2014 | Campbell et al. | |
| 8,922,333 | B1 | 12/2014 | Kirkjan | |
| 9,378,597 | B2 | 6/2016 | Shen et al. | |
| 9,728,022 | B2 | 8/2017 | Gengler et al. | |
| 10,544,624 | B2 | 1/2020 | Baker et al. | |
| 11,313,152 | B2 | 4/2022 | Tartal et al. | |
| 11,590,862 | B2 | 2/2023 | Yetukuri | |
| 11,732,506 | B2 * | 8/2023 | Tartal | E05B 65/06 70/78 |
| 2002/0180582 | A1 | 12/2002 | Nielsen | |
| 2003/0160681 | A1 | 8/2003 | Menard et al. | |
| 2004/0032131 | A1 | 2/2004 | Cherry | |
| 2005/0285716 | A1 | 12/2005 | Denison et al. | |
| 2007/0096866 | A1 | 5/2007 | Denison et al. | |
| 2007/0173253 | A1 | 7/2007 | Duan et al. | |
| 2007/0257773 | A1 | 11/2007 | Hill et al. | |
| 2009/0273440 | A1 | 11/2009 | Marschalek et al. | |
| 2009/0282876 | A1 | 11/2009 | Zuraski | |
| 2009/0302995 | A1 | 12/2009 | Park | |
| 2010/0073133 | A1 | 3/2010 | Conreux et al. | |
| 2011/0181053 | A1 | 7/2011 | Marschner et al. | |
| 2012/0270496 | A1 | 10/2012 | Kuenzi et al. | |
| 2013/0067969 | A1 | 3/2013 | Webb et al. | |
| 2013/0317693 | A1 | 11/2013 | Jefferies | |
| 2013/0332007 | A1 | 12/2013 | Louboutin | |
| 2013/0342314 | A1 | 12/2013 | Chen | |
| 2014/0120905 | A1 | 5/2014 | Kim | |
| 2014/0149269 | A1 | 5/2014 | Kantarjiev et al. | |
| 2014/0353983 | A1 | 12/2014 | Vetter | |
| 2015/0027178 | A1 | 1/2015 | Scalisi | |
| 2015/0141045 | A1 | 5/2015 | Qiu et al. | |
| 2015/0184426 | A1 | 7/2015 | Arlinghaus et al. | |
| 2015/0211258 | A1 | 7/2015 | Gokcebay | |
| 2015/0221152 | A1 | 8/2015 | Andersen | |
| 2015/0282581 | A1 | 10/2015 | Chen | |
| 2015/0332527 | A1 | 11/2015 | Pukari | |
| 2016/0042582 | A1 | 2/2016 | Hyde et al. | |
| 2016/0055694 | A1 | 2/2016 | Saeedi et al. | |
| 2016/0086400 | A1 | 3/2016 | Dumas et al. | |
| 2016/0098871 | A1 | 4/2016 | Oz et al. | |
| 2016/0186463 | A1 | 6/2016 | Roatis et al. | |
| 2016/0217637 | A1 | 7/2016 | Gengler et al. | |
| 2016/0232484 | A1 | 8/2016 | Skaaksrud | |
| 2016/0275450 | A1 | 9/2016 | Chang | |
| 2017/0002586 | A1 | 1/2017 | Lee | |
| 2017/0030111 | A1 | 2/2017 | Vetter | |
| 2017/0061716 | A1 | 3/2017 | Davis et al. | |
| 2017/0124510 | A1 | 5/2017 | Caterino et al. | |
| 2017/0328130 | A1 | 11/2017 | Baker et al. | |
| 2018/0060800 | A1 | 3/2018 | Robinson | |
| 2018/0075679 | A1 | 3/2018 | Niroomand | |
| 2018/0300677 | A1 | 10/2018 | Wilkinson et al. | |
| 2019/0246276 | A1 | 8/2019 | Lingala | |
| 2020/0294340 | A1 | 9/2020 | Myers | |
| 2021/0010315 | A1 | 1/2021 | Honjo | |
| 2021/0074092 | A1 | 3/2021 | Davis | |
| 2022/0223013 | A1 | 7/2022 | Persson | |
| 2022/0408261 | A1 | 12/2022 | Everson | |
| 2023/0098945 | A1 | 3/2023 | Elfstrom | |
| 2023/0162548 | A1 | 5/2023 | Ruffkess | |
| 2024/0054828 | A1 | 2/2024 | Tartal | |

FOREIGN PATENT DOCUMENTS

| | | | |
|---|---|---|---|
| CN | 107829616 | A | 3/2018 |
| EP | 2876234 | A1 | 5/2015 |
| JP | 2008540880 | A | 11/2008 |

OTHER PUBLICATIONS

International Search Report & Written Opinion dated Aug. 27, 2019 in International Application No. PCT/US2019/032250 filed May 14, 2019.

International Search Report and Written Opinion mailed Dec. 16, 2019 in International Application No. PCT/US2019/52659 filed Sep. 24, 2019.

International Preliminary Report on Patentability dated Dec. 17, 2019 in International Application No. PCT/US2018/037159 filed Jun. 12, 2018.

International Preliminary Report on Patentability mailed Nov. 26, 2020 in International Application No. PCT/US2019/032250 filed May 14, 2019.

International Preliminary Report on Patentability dated Apr. 8, 2021 in International Application No. PCT/US2019/052659 filed Sep. 24, 2019.

* cited by examiner

ELECTRONIC LOCK

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 16/887,537, filed on May 29, 2020, which is a divisional application of U.S. application Ser. No. 16/412,132, filed May 14, 2019, now U.S. Pat. No. 11,313,152, issued Apr. 26, 2022, which claims the benefit of U.S. Provisional Application Ser. No. 62/671,848, filed May 15, 2018, entitled “ELECTRONIC LOCK” the entirety of which is incorporated by reference herein.

FIELD

The disclosure relates to locks. More specifically, it relates to electronic locks on doors to control access therethrough, such as access to lockable receptacles which are configured to contain and/or enclose an item.

BACKGROUND

Items, such as articles of mail, which can include letters, flats, parcels and the like, warehouse inventories, packages, or parcels are frequently delivered by item carriers to item recipients, for example, in a distribution network. Currently, item delivery can be to receptacles that can be susceptible to theft. Improved lock mechanisms for item receptacles can be advantageous for a carrier to efficiently and securely gain access to a secured item delivery point.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, a securable receptacle is described. A mobile power supply, such as a wireless power system or inductive power transfer system can be used to power an electrical lock mechanism. The receptacle comprises a wall at least partially surrounding an inner volume of the receptacle, a hinged door coupled to the receptacle, the door comprising an unlocking member extending from an interior surface of the door toward the interior volume of the receptacle, the unlocking member comprising a shelf portion facing toward the interior surface of the door, and a lock coupled to an interior surface of the wall. The lock comprises a rack having a plurality of teeth, the rack being slidable along a longitudinal axis between a locked position in which an end portion of the rack contacts the shelf portion of the unlocking member to retain the door in a closed position, and an unlocked position in which the end portion of the rack does not contact the shelf portion; a first biasing member configured to exert a linear door-opening force against the unlocking member; a second biasing member configured to exert a linear force against the rack toward the locked position; a pinion gear comprising a plurality of teeth configured to engage the teeth of the rack, the plurality of teeth extending along less than the full circumference of the pinion gear such that, in at least one angular orientation, the teeth of the pinion gear do not engage the teeth of the rack; and a motor configured to rotate the pinion gear in a first direction to slide the rack from the locked position to the unlocked position. The second biasing member causes the rack to return to the locked position when the pinion gear reaches an angular orientation in which the teeth of the pinion gear do not engage the teeth of the rack.

In some embodiments, the receptacle further comprises a wireless receiver in communication with the motor.

In some embodiments, the wireless receiver is in communication with a processor configured to cause activation of the motor based at least in part on receiving and verifying a security credential from a mobile device in proximity to the wireless receiver.

In some embodiments, the wireless receiver is configured to wirelessly receive electrical power and to cause the electrical power to be transferred to the motor.

In some embodiments, the receptacle further comprises a switch proximate at least a portion of the pinion gear, the switch configured to cause, at least in part, deactivation of the motor after the pinion gear the angular orientation in which the teeth of the pinion gear do not engage the teeth of the rack.

In some embodiments, at least one of the first biasing member and the second biasing member comprises a spring.

In some embodiments, the rack comprises a protrusion extending from a side of the rack opposite the teeth of the rack, and wherein the receptacle further comprises an override system configured to engage with the protrusion.

In some embodiments, the override system comprises a key lock and an unlocking arm coupled to the key lock, and wherein turning a key in a first direction in the key lock causes the unlocking arm to engage with the protrusion to slide the rack toward the unlocked position.

In some embodiments, the override system comprises a secondary lock having a locked configuration in which an unlocking arm engages with the protrusion to prevent the rack from sliding to the unlocked position, and an unlocked configuration in which the unlocking arm does not prevent the rack from sliding to the unlocked position.

In another embodiment, an electronic lock comprises a first gear comprising a plurality of first gear teeth, the first gear being slidable along a longitudinal axis between a locked position in which an end portion of the first gear contacts an outward-facing shelf portion of an unlocking member of a receptacle to retain a door of the receptacle in a closed position, and an unlocked position in which the end portion of the first gear does not contact the shelf portion; a first biasing member configured to exert a linear force against the unlocking member; a second biasing member configured to exert a linear force against the first gear toward the locked position; a second gear comprising a plurality of second gear teeth configured to engage the plurality of first gear teeth, the plurality of second gear teeth extending along less than the full circumference of the second gear such that, in at least one angular orientation, the second gear teeth do not engage the first gear teeth; and a motor configured to rotate the second gear in a first direction to slide the first gear from the locked position to the unlocked position. The second biasing member causes the first gear to return to the locked position when the second gear reaches an angular orientation in which the teeth of the second gear do not engage the teeth of the first gear.

In some embodiments, the unlocking member is attached to an interior surface of the door of the receptacle, and wherein the linear force is an outward linear door-opening force.

In some embodiments, the lock is attached to an interior surface of the door of the receptacle, and wherein the linear force is an inward linear door-opening force.

In some embodiments, the electronic lock further comprises a wireless receiver in communication with a processor and the motor.

In some embodiments, the wireless receiver is configured to receive a security credential from a mobile device in proximity to the wireless motor, and wherein the processor is configured to verify the security credential.

In some embodiments, the processor is further configured to cause activation of the motor based at least in part on verifying the security credential.

In some embodiments, the wireless receiver is configured to wirelessly receive electrical power and to cause the electrical power to be transferred to the motor.

In some embodiments, the electronic lock further comprises a switch proximate at least a portion of the second gear, the switch configured to cause, at least in part, deactivation of the motor after the second gear reaches the angular orientation in which the second gear teeth do not engage the first gear teeth.

In some embodiments, the switch comprises a mechanical contact positioned to be actuated by the second gear teeth.

In some embodiments, the first gear comprises a rack gear, and wherein the second gear comprises a pinion gear.

In a further embodiment, an electronic locking system comprises retention means for retaining a unlocking member of a receptacle when the retention means is in a locked position; translation means for engaging and translating the retention means from the locked position to an unlocked position; actuation means for moving the translation means; and power supply means for providing electrical power to the actuation means.

Figure 1:
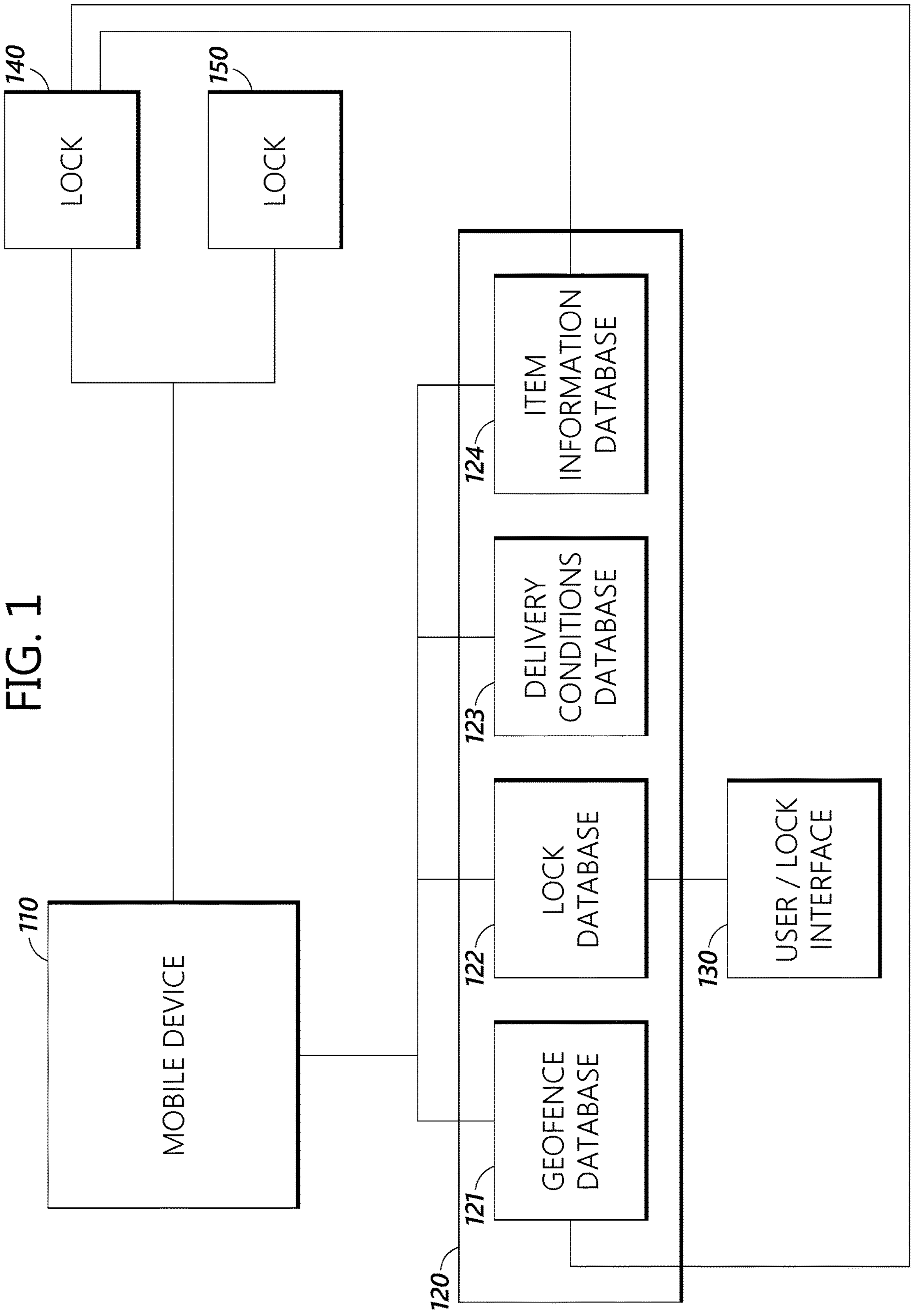
FIG. 1 is a block diagram of an example electronic lock system.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and as illustrated in the figures, can be arranged, substituted, combined and designed in a wide variety of configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

Generally described, the present disclosure provides locking devices which can provide for faster and more efficient delivery and/or retrieval of items. In particular, the locking devices described herein may be unlockable, at least in part, by a mobile computing device carried by an item carrier while delivering or retrieving items at one or more delivery points along a route. In some embodiments, this mobile computing device may be a smartphone, tablet, or other personal electronic device executing one or more applications, a mobile delivery device ("MDD") as used by the United States Postal Service, or other mobile device. This mobile device can be used for many functions, some of which are described herein. To perform these functions, the mobile device can communicate, via a wired and/or wireless connection(s), with numerous outside components, including external databases and other peripherals.

A carrier (e.g., an item carrier, mail carrier, etc.) can delivery to a plurality of locked receptacles or groups of receptacles, and each of the plurality of locked receptacles or groups of receptacles can require a separate physical key. A carrier may not desire to carry around multiple keys for each of the locked mailboxes along his route. In some embodiments, a lock can be secured using digital authorization systems, such that a single device such as a mobile computing device (e.g., an MDD or the like) can open a plurality of different locks. This can be advantageous to improve security and to avoid the need for carriers to carry multiple keys. Additionally, recipients may desire a secure mailbox which uses an electronically secured lock. Electronic lock mechanisms may require a source of electrical energy for at least some operations, such as locking or unlocking, but some delivery points, such as collection boxes, mailboxes, and the like, may not have access to electrical power sources. Batteries can be used in receptacles at delivery points, but battery powered system can be expensive and may require logistics for monitoring and replacing batteries. Moreover, battery life can be dependent on weather conditions. Rechargeable battery systems, such as solar-powered systems may not be reliable and can be sensitive to weather extremes. Some systems may malfunction depending on the position of the sun or can be easily damaged. Some systems may use solenoids which draw a relatively high current to move a bolt in a locking mechanism. In some configurations, solenoids can require a substantial amount of power. A low-power electronic locking system can therefore be advantageous.

Some of the locking devices described herein include motorized or otherwise electrically actuated locks that receive power from a battery and/or a wireless power source. For example, in some embodiments the mobile computing device may inductively provide electricity to a locking device to power a security or credential verification to allow the lock to be opened. This process will be described in greater detail below.

After credential verification, the mobile computing device provides power to a motor, solenoid, or other lock component, via an inductive power transfer, to unlock the lock to open the receptacle. Size, battery, and other constraints may limit the amount of power that can be inductively transferred from a mobile computing device to the lock mechanism. Accordingly, embodiments of the locking devices described herein are configured to advantageously require a small amount of power. For example, features such as micro switches, gearing components having gear teeth along only a portion of the components, biasing members, etc., can advantageously allow the electronic locking systems to reduce and/or minimize the amount of power drawn for each unlocking event. Moreover, some embodiments are configured such that, following an unlocking event, the locking mechanism automatically returns to a ready-to-unlock state without requiring a second, powered locking event.

In some embodiments, the locking devices may include additional security features, such as secondary and/or redundant locks, multi-credential locking, and/or key-based override devices. For example, a motorized locking device may require the presence of both a mobile device and a fob in proximity to the lock, in order to unlock the receptacle. In some cases, the fob and/or the mobile device may each be a source of a wirelessly transmitted security code and/or a wireless power source for the motor. These and other advantages of the present disclosure will become apparent from the description that follows.

An embodiment of an exemplary electronic lock system, including various components that the mobile device can communicate with, is schematically depicted in FIG. 1. FIG. 1 shows a mobile device 110 usable with a lock system of a distribution network. In addition to the mobile device 110, the lock system includes one or more databases 120, a user/lock interface 130, a lock 140, and an optional fob 150.

As described above, the mobile device 110 can be used by the item carrier to improve the efficiency and security of delivering and/or retrieving items. For example, item carriers can use the mobile device 110 to lock or unlock secure delivery points, such as lockable receptacles. The mobile device 110 may also be configured to display information about delivery conditions on delivery routes. In some embodiments, the mobile device 110 can also be used to create or edit information associated with delivery locations. The mobile device 110 can further be used to identify when an item carrier is potentially delivering or retrieving an item at an incorrect location.

In performing these various functions, it can be advantageous for an item carrier to know where he currently is and what delivery point he is either at or approaching. In some embodiments, this can be achieved using a technique known as geofencing. When using geofencing, a geographic area associated with an address, delivery point, or other location is defined using a set of geodetic coordinates creating a "fence" around the area. A device can then know what location, address, or delivery point the device is at based upon the current location of the device and whether or not the location of the mobile device 110 is contained within the geodetic coordinates of the geofence. Because using geofencing can be advantageous to the various functions that the mobile device 110 performs, in some embodiments the mobile device can determine its current location and compare it to a list of geofences stored locally on the device and/or stored remote from the device.

In some embodiments, mobile device 110 is in communication with one or more databases 120 in order assist in the performance of the mobile devices functions. In some embodiments, mobile device 110 communicates with databases 120 via telephone, cable, fiber-optic, or any other wired communication network. In some embodiments, mobile device 110 may communicate with databases 120 via cellular networks, WLAN networks, or any other wireless network. In some embodiments mobile device 110 may not need to separately communicate with databases 120, for example, if databases 120 are located within mobile device 110.

In various example embodiments, databases 120 can include a geofence database 121, a lock database 122, a delivery conditions database 123, and/or an item information database 124. Although the databases 120 are depicted as including a plurality of separate databases, it will be appreciated that some or all of the information associated with the geofence database 121, lock database 122, delivery conditions database 123, and/or item information database 124 may be located within a single database. The various processing functions that will be described in connection with the databases 120 may be performed at the databases 120 and/or at additional computing resources, such as servers, processors, or the like in communication with the databases 120. The geofence database 121 can store the various sets of geodetic coordinates that form a fence around areas associated with one or more delivery points and/or collection points or other locations disposed, for example, along a carrier's route. In some embodiments, the mobile device 110 can send the current location of the mobile device to the geofence database 121 and receive a responsive communication including an address, delivery point, geofence, or other location that the mobile device 110 is currently at, near, or approaching. In some embodiments, the mobile device 110 can periodically send its location to the geofence database 121 and the geofence database 121 will periodically send a responsive communication including an address, delivery point, geofence, or other location that the mobile device 110 is currently at, near, or approaching. In some embodiments, the mobile device 110 can record its location periodically (e.g., every second, every few seconds, every minute, etc.) and periodically send a set of the recorded locations to the geofence database 121, such as every 1 minute, 5 minutes, etc. In some embodiment, the geofence database 121 can use the entire set of geodetic coordinates to determine a mobile device 110's location. In some embodiments, the geofence database 121 may transmit one or more of the various sets of geodetic coordinates to the mobile device 110 so that the mobile device can itself determine an address, delivery point, geofence, or other location that the mobile device 110 is currently at, near, or approaching. For example, the geofence database 121 can transmit the sets of geodetic coordinates associated with every planned or predetermined delivery point along the route of the item carrier who will be using the mobile device 110.

In some embodiments, the geofences can be algorithmically defined based on the type of location or delivery point located within the geofence. For example, if the geofence is designating a delivery point at a house, the algorithm may take as input the geodetic coordinates for the delivery point and calculate a geofence of approximately 10 or 20 meters surrounding the delivery point. If the geofence is designating a delivery point at an apartment building, the algorithm may calculate a geofence of 30 or 40 meters surrounding the point. If the geofence is designating location with a delivery condition such as a slippery surface, the geofence may be 5 meters surrounding the geodetic coordinate of the slippery surface.

In some embodiments, custom geofences can be individually added to the geofence database 121. For example, a user may designate a geofence that precisely follows the property line of a house or that is two meters north of a location, three meters west, 3 meters, east and 4 meters south. In some embodiments, the mobile device 110 can be used to add custom geofences to the geofence database 121. In other embodiments, geofence database 121 can be connected to a personal computer or other terminal, which may be used to add custom geofences to the database. For example, a supervisor of the item carriers using the mobile devices may receive a list of delivery conditions such as slippery surfaces and the associated locations from each item deliverer and create a custom geofence for each delivery condition.

In some embodiments, the databases 120 can include a lock database 122. The lock database 122 can contain information about the locks used to secure secured delivery points. In some embodiments, the lock database 122 can contain a lock ID for locks associated with secured delivery points that have been registered in a system. The lock ID can be associated with an address at which the lock is located, or an address that corresponds to the delivery point receptacle on which the lock is installed. In some embodiments, the lock database 122 can communicate encryption keys or parts of encryption keys that can be used by a mobile device 110, for example, to at least partially unlock a locked receptacle. In some embodiments, the lock database 122 stores a different encryption key for every lock that has been registered with a distribution entity. In some embodiments the lock database 122 sends the encryption keys or parts of encryption keys to the mobile device 110. In some embodiments, the lock database 122 sends the encryption keys or parts of keys to the mobile device for every delivery point along the route of the item carrier who will be using the mobile device 110.

In some embodiments, the lock database 122 can also be in communication with a user/lock interface 130 via telephone, cable, fiber-optic, cellular networks, WLAN networks, or any other wired or wireless communication network. The user/lock interface 130 can be used to register compatible locks for securing delivery points. In some embodiments, the lock can be registered by entering a lock ID into the lock database 122. In some embodiments, the user/lock interface 130 includes a website or similar system accessed by a personal computer, phone or the like. The user enters the lock ID and the associated delivery point or address for the lock into the website, which then registers the lock ID with the lock database 122. In some embodiments the user/lock interface 130 is an app on a smartphone or similar device. In some embodiments, the app can be used to register the lock ID with the lock database 122 by scanning a QR or barcode or other computer readable code on the lock. This can generate the correct lock ID in the app which then communicates the lock ID with the lock database 122. In some embodiments, the user can then enter the associated delivery point or address. In other embodiments, the user can scan the lock ID while at the delivery point or address that the user wants to be associated with the lock. The app can then enter the current location as the delivery point or address by using the current location calculated by the smartphone or similar device.

In some embodiments, the databases 120 can include a delivery conditions database 123. Delivery conditions database 123 can store delivery conditions such as information about hazards or other useful information associated with various delivery points or addresses. For example, the delivery conditions database 123 can store information such as an indication that a certain address or delivery point or other location has a dog, that there is a slippery surface, that there is a trip hazard, that the mailbox for that delivery point or address is at the back of the building, that there is construction blocking the address, etc. The delivery conditions database 123 can also include specific delivery instructions for an address, such as "do not walk on grass," times or time ranges when a person to receive an item will be home, instructions to deliver items to the garage or other house location, instructions to only ring the doorbell at certain times that the person is home, a gate or door code necessary to access a delivery location, etc. For example, in some embodiments, the mobile device 110 can add and delete delivery conditions from the delivery conditions database 123. The delivery conditions changes can then be dispersed to all other mobile devices that are or will be in communication with the delivery conditions database 123.

In some embodiments, the delivery conditions database 123 disperses the changed delivery condition information through a network with which the mobile devices 110 are in communication. In some embodiments, the mobile devices 110 can be charged on charging stations, and the charging stations can include a network connection between a processor, the delivery conditions database 123, and/or other components of a distribution network, and the mobile device 110. In some embodiments, the delivery conditions database 123 can transmit delivery conditions to the mobile device 110 so that the mobile device 110 can display information about the delivery conditions. In some embodiments, the delivery conditions database 123 sends some or all of the delivery conditions to the mobile device 110 for every delivery point or other location along the route of the item deliverer who will be using the mobile device 110. In other embodiments, the delivery conditions database 123 can send some or all of the information about delivery conditions, with individual mobile devices selectively activating alerts about delivery conditions for delivery points, addresses or other locations on or near its route. In some embodiments, the mobile device 110 can additionally activate alerts for delivery conditions on a different route if the mobile device determines that the item carrier using the mobile device 110 is now traveling a different route from an originally selected route.

In some embodiments, the databases 120 can include an item information database 124. The item information database 124 can contain entries associated with individual items to be picked up or delivered, and may further contain information associated with the individual items, such as a correct delivery point or address for each item to be delivered or picked up by the item carrier, routes for each item carrier to use when delivering items, or the like. In some embodiments, the item information database 124 sends some or all information about the correct delivery points to the mobile device 110 for each item to be delivered along the predetermined route of the item carrier who will be using the mobile device 110. The mobile device 110 can then use that information to determine whether the item carrier is potentially delivering an item to an incorrect location. In some embodiments, the mobile device 110 can determine where the item is being delivered by having the item carrier scan a barcode, QR code, or other identifier on the item using the mobile device 110. The mobile device 110 can then use its location in combination with the GPS coordinates of the mobile device 110 to determine where the scan occurred and if the scan occurred at a location within the geofence around the correct delivery or pickup location. In some embodiments, the mobile device can send the location where the scan occurred to the item information database 124, such that the item information database 124 can determine where the scan should occur and if the scan occurred at a correct location.

In some embodiments, the mobile device 110 can communicate with a lock 140 or other locking system. In some embodiments, lock 140 is a lock used to secure a receptacle or the like at a delivery point or collection point. In some embodiments the lock 140 is an electronic lock that can communicate with the mobile device 110. In some embodiments, the mobile device 110 and lock 140 can communicate via Bluetooth pairing, R/F communication link, or some other wireless or wired communication protocol. In some embodiments, the mobile device 110 can communicate an encryption key to the lock 140, for example, to unlock the lock 140 and/or to allow the lock 140 to be unlocked by a key or other credential. As discussed further below, in some embodiments, the mobile device 110 can work in conjunction with a fob 150 to unlock lock 140. In some embodiments, the lock can also be unlocked via a physical key, using an electronic key pad, and/or by linking with a device other than the mobile device 110. In some embodiments, the lock 140 is configured to log unlocking events and/or attempts and associated information such as a method used to unlock the lock 140, a person or mobile device 110 associated with the event, or the like. In some embodiments, the mobile device 110 can transmit a mobile device identification token that can be used by the lock 140 to log which mobile device unlocked the lock 140.

In some embodiments, the lock 140 can communicate to the mobile device 110 its identity, such as by transmitting a lock identifier to the mobile device 110. The mobile device, or another processor in the system 100, can query the geofence database 121 to determine whether the mobile device 110 is geographically located within a geofence assigned to the receptacle associated with the transmitted lock identifier. This check can provide a level of assurance for the locking mechanism to allow access. In some embodiments, this step must be confirmed before a key or credential can be transmitted to the lock 140. In some embodiments, the mobile device 110 can confirm that the receptacle associated with the lock identifier is located at a point along a route to which the mobile device 110 has been assigned, and that the interaction between the mobile device 110 and the lock 140 are occurring at a time corresponding to the carrier moving along a normal route.

In some embodiments, the mobile device 110 can also be in communication with the fob 150. In some embodiments, the fob 150 can work in conjunction with mobile device 110 to unlock the lock 140. For example, the fob 150 may contain an additional encryption key or portion of an encryption key, and may separately communicate its key or portion of the key to the lock 140. In other embodiments, the fob 150 may contain the entire encryption key and transmit the entire key to the lock 140. In some embodiments, the mobile device 110 can load the encryption key or portion of the encryption key into the fob 150 using Bluetooth, R/F link, or other wireless or wired communication protocol. In some embodiments, the mobile device 110 can load a new key or partial key into the fob some or all times the mobile device approaches a new lock 140. In some embodiments, only keys to open receptacles along a route assigned to a mobile device 110 are loaded onto the mobile device 110 and/or the fob 150. In this way, the mobile device 110 cannot be used to unlock any receptacle, but only receptacles along the assigned route. An encryption key is used herein as an example only. The mobile device 110 and fob 150 can use a token, a unique identifier, or other similar mechanism to communicate with the lock 140, and to establish a trusted relationship, be recognized, etc. sufficient to allow operation of the lock 140.

Figure 2:
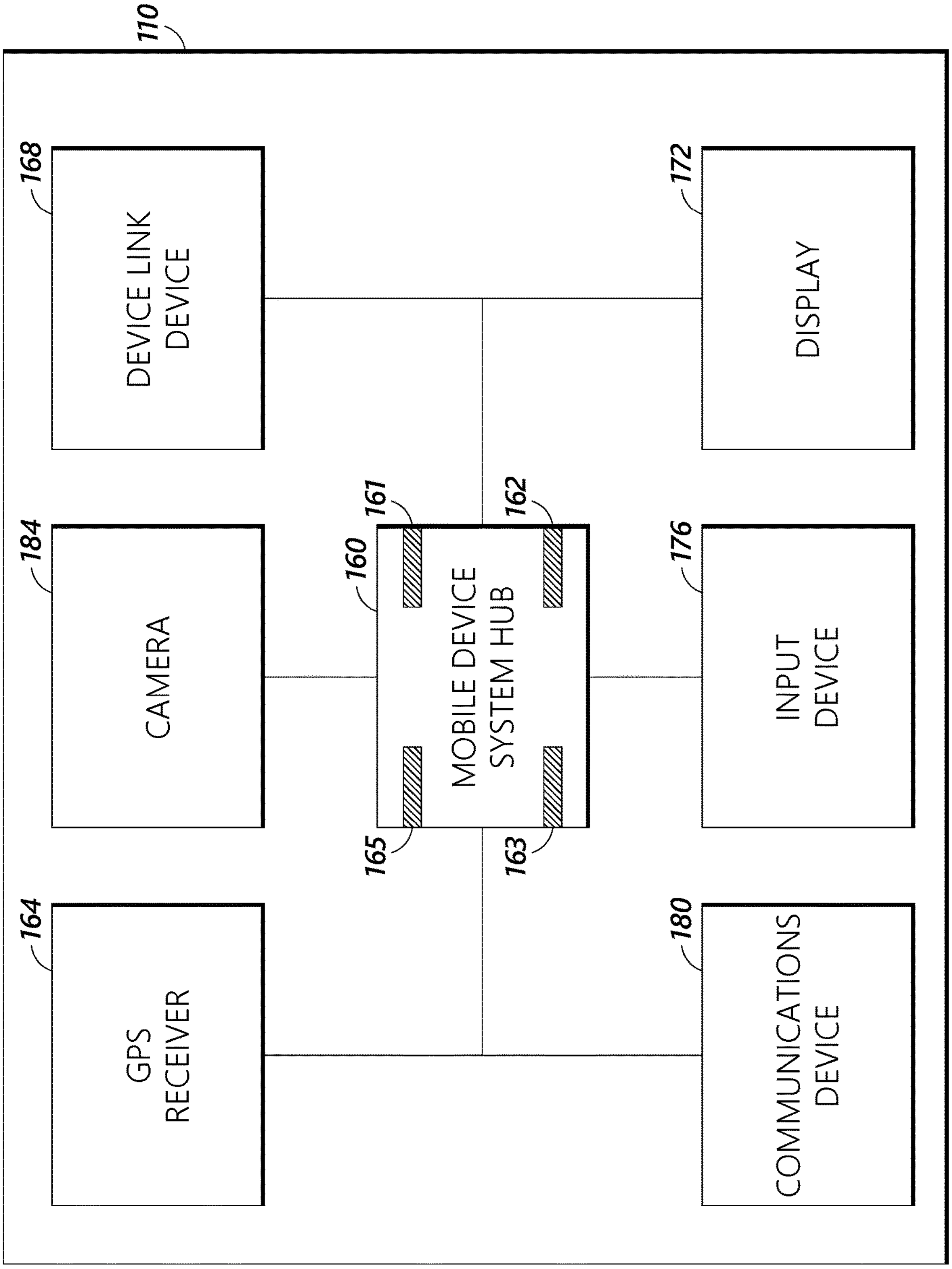
FIG. 2 is a block diagram of an example mobile device for an electronic lock system.

FIG. 2 is a block diagram schematically depicting example components of the mobile device 110. In some embodiments, the mobile device 110 can include a system hub 160, a GPS receiver 164, a device link device 168, a display 172, an input device 176, and a communications device 180.

The system hub 160 may comprise or be a component of a processing system implemented with one or more processors. The system hub 160 may include a network of interconnected processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 160 may comprise a processor 161 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-Series®, or FX® processor, or the like. The processor 161 typically has conventional address lines, conventional data lines, and one or more conventional control lines. The processor 161 may be in communication with a processor memory 162, which may include, for example, RAM memory, flash memory, ROM memory, EPROM memory, EEPROM memory, registers, hard disk, a removable disk, a CD-ROM, or any other form of storage medium known in the art. The processor memory 162 may include, for example, software, at least one software module, instructions, steps of an algorithm, or any other information. In some embodiments, the processor 161 performs processes in accordance with instructions stored in the processor memory 162. These processes may include, for example, controlling features and/or components of the mobile device 110, and controlling access to and from, and transmitting information and data to and from the system hub 160 and the constituent components of the mobile device 110, as will be described herein.

The system hub 160 comprises a system memory 163, configured to store information, such as data received from the geofence database 121, lock database 122, delivery conditions database 123, item information database, and the like, as shown in FIG. 1. The system memory 163 may comprise a database, a comma delimited file, a text file, or the like. The system hub 160 is configured to coordinate and direct the activities of the components of the expected mobile device 110.

In some embodiments, the processor 161 is connected to a communication feature 165. The communication feature 165 is configured for wired and/or wireless communication. In some embodiments, the communication feature 165 communicates via telephone, cable, fiber-optic, or any other wired communication network. In some embodiments, the communication feature 165 may communicate via cellular networks, WLAN networks, or any other wireless network. The communication feature 165 is configured to receive instructions and to transmit and receive information among components of the mobile device 110, and in some embodiments, with a central server (not shown) or the databases, or other resources outside the mobile device 110, as desired.

In some embodiments, the various components of the mobile device 110 such as the GPS receiver 164, device link device 168, display 172, input device 176, or communications device 180 can be configured to use the processor 161, memory 162, system memory 163, or communications feature 165 or other components of the mobile device system hub 160, or to have their own memory, processor, system memory, or communications feature or other components as desired.

The GPS receiver 164 is in communication with GPS satellites and can discover the specific location of the mobile device 110 through its communications with the GPS satellites. In some embodiments the GPS receiver 164 uses other position determining systems to determine its exact location, such as GLONASS, COMPASS, multilateration, Wi-Fi detection, triangulation, or LORAN. In some embodiments, the GPS receiver 164 records the location of the mobile device periodically, such as at a specific time interval.

In some embodiments, device link device 168 can comprise circuitry and/or other components to establish a Bluetooth® communication link, R/F communication link, or other wireless or wired communication link. In some embodiments, the device link device 168 is used to establish a communication link with lock 140 or fob 150. In some embodiments, the device link device 168 is used to transmit the encryption key from the mobile device 110 to the lock 140 or fob 150.

In some embodiments, the mobile device 110 can also include a display 172. In some embodiments, display 172 is a display screen, touch screen, or other method of displaying information. In some embodiments, the display 172 can display information received from the various databases 120 or other information to the user. For example, the display 172 can display information from the delivery conditions database 123 to alert or instruct an item carrier, information from the item information database 124 or geofence database 121 to instruct the item carrier regarding a delivery location, or the like.

In some embodiments, the mobile device 110 can also include an input device 176. The input device 176 can be a key board, touch screen, or the like. For example, a touch screen may comprise both the display 172 and the input device 176. The input device 176 can be used by the user of the mobile device 110, such as an item carrier, to control the operations of the mobile device 110.

In some embodiments, the mobile device 110 can also include a communications device 180. In some embodiments, the communications device 180 may communicate via cellular networks, WLAN networks, or any other wireless or wired network. The communications device 180 can be used to receive or send information to the databases 120 or any other peripheral device that the mobile device 110 may need to communicate with.

In some embodiments, the mobile device 110 can also include a camera 184. In some embodiments, camera 184 can be used to capture images. Images may be stored in the mobile device memory 162 and/or may be transmitted to the delivery conditions database 123 or other remote storage location. In some embodiments, the images captured by the camera can comprise delivery condition information. In some embodiments, the camera 184 can also be used to scan barcodes, QR codes, or other visual identifiers. The mobile device 110 can then use this information to identify items that are being delivered. In some embodiments, the mobile device 110 can use a dedicated scanner instead of the camera to scan barcodes, QR codes, or other visual identifiers.

Figure 3:
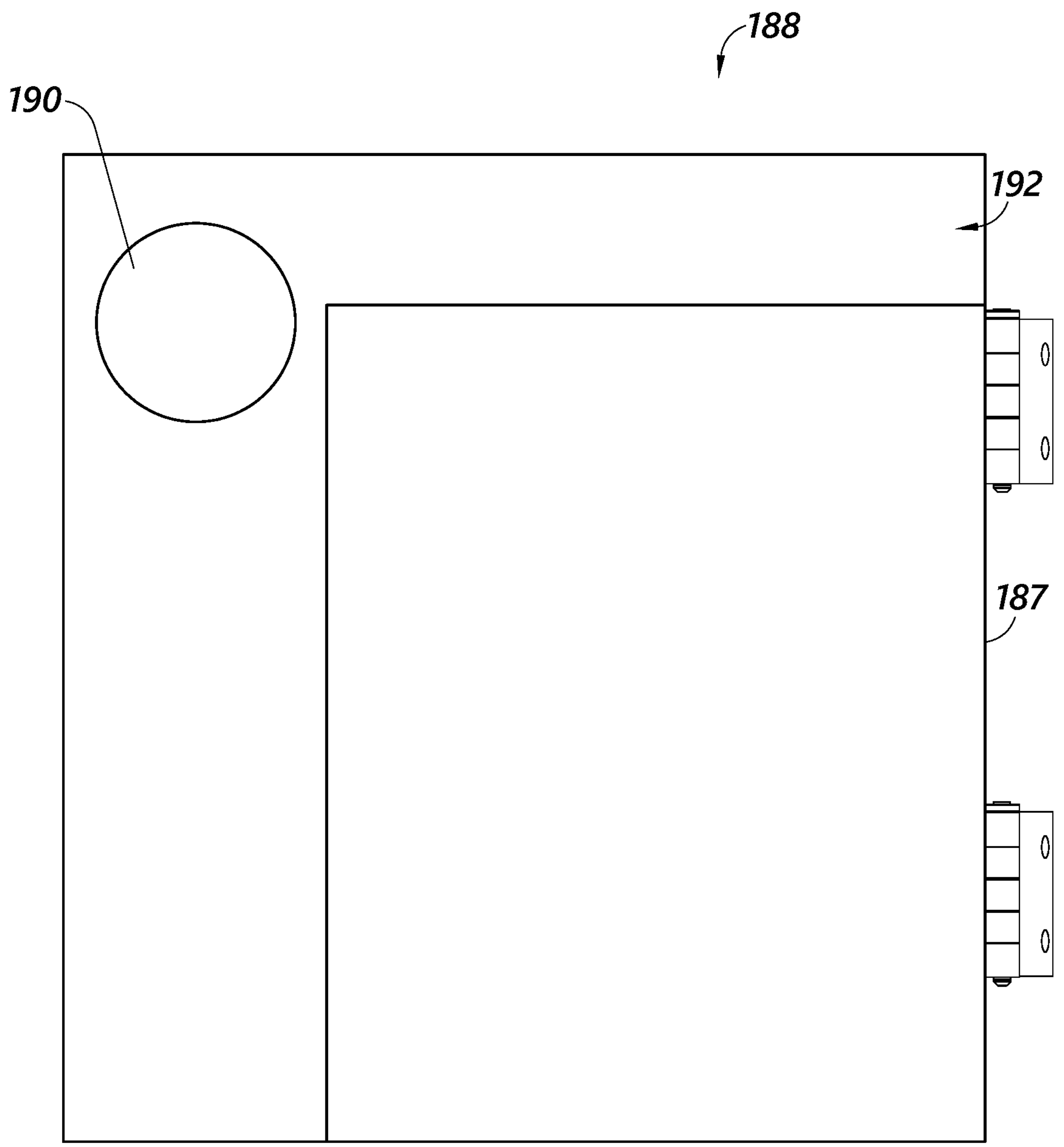
FIG. 3 depicts a door of a receptacle.

FIG. 3 depicts an exterior of a receptacle 188. An exterior side 192 of the receptacle 188 can have a power receiver 190 disposed thereon or therein. The power receiver can use, for example, the Qi protocol. The power receiver 190, or an additional component, can include a wireless communication protocol, such as Bluetooth, NFC, and the like, for exchanging information with the mobile device 100. In some embodiments, the exterior side 192 can have an indicator, such as a word, target, and the like identifying where the power receiver 190 is located, enabling a delivery resource to align a mobile device 110 with the power receiver 190. The exterior side 192 can include a door 187 which is held shut via a lock. The receptacle 188 can be a lockable receptacle, for example, a locker, mailbox, collection box, or other type of item container.

Figure 4:
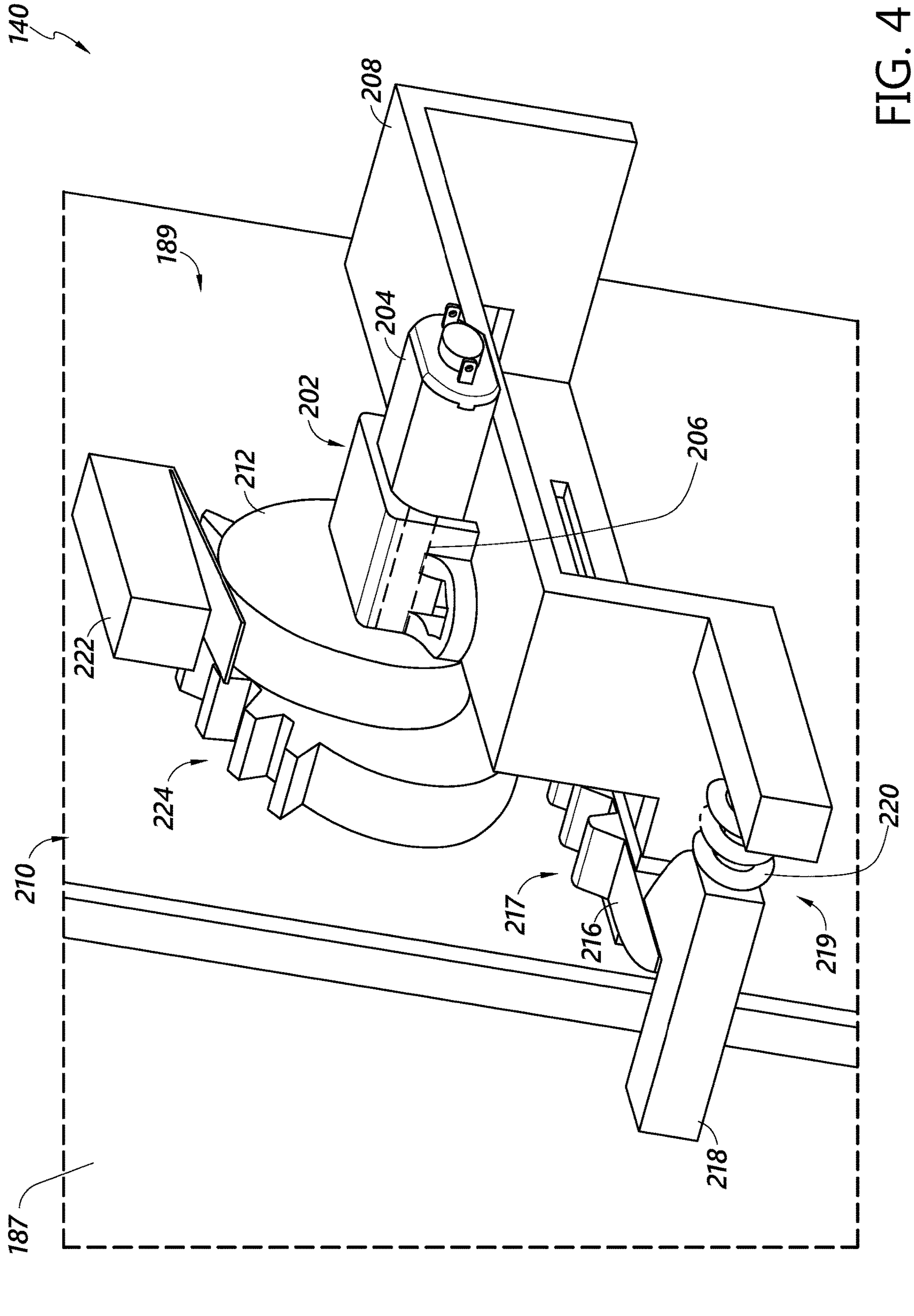
FIG. 4 is a perspective view of an embodiment of an electronic lock disposed in an interior volume of a receptacle.

FIG. 4 depicts an interior view of the lock 140 inside the receptacle 188. The lock 140 can be advantageously used on a multi-unit mailbox, such as on a community mailbox, a cluster box unit, a centralized mailbox, a parcel locker, and the like. Where a lock 140 is used to secure a receptacle, it is desirable to ensure the integrity of the lock to keep safe the contents of the receptacle. Certain types of locks have been defeated and/or can require a large amount of power and/or time to unlock. A lock that requires less power and/or can be unlocked more efficiently can be advantageously used. Some locks that have enhanced security features are described herein.

Generally, the power receiver 190 can be configured to receive a wireless power transmission (e.g., inductive power transfer or the like) and/or wireless communication signals. For example, the power receiver 190 can receive the power to be used to actuate a motor and/or other components of the lock 140. The power receiver 190 can be positioned at least partially on the external side 192 of the receptacle 188. The power receiver 190 can further be configured to communicate with a fob 150 (FIG. 2) or other electronic communication mechanism. For example, the power receiver 190 can be configured to wirelessly receive an authentication signal from the fob 150 to unlock the receptacle 188. In some embodiments, the fob 150 is configured to communicate with the power receiver 190 upon contact between the fob 150 and the power receiver 190. In some embodiments, the fob 150 is configured to detect power draw upon contact with the power receiver 190. Such configurations can allow the fob 150 to immediately or shortly thereafter search for and/or listen for devices in range to connect to the lock 140. Upon connection between the fob 150 and the lock 140, as described above, the system can securely verify the connection and wirelessly receive an authentication signal to unlock the receptacle 188.

With continued reference to FIG. 4, the lock 140 can be coupled with at least a portion of the receptacle 188, such as the door 187. In some embodiments, the lock 140 is positioned at least partially in the interior volume of the receptacle 188, for example, as depicted in FIGS. 4-13. The lock 140 can be positioned on the door 187 or other portion of the container, such as an interior wall 189 of the door 187 of the receptacle 188. The lock 140 can be electrically coupled with the power receiver 190. For example, the lock 140 can be positioned in the interior volume of the receptacle 188 at a position opposite the power receiver 190. In various embodiments, any powered components of the lock 140 can be electrically connected to the power receiver 190 via a wired or wireless connection. For example, in some embodiments electrical power is transferred from the power receiver 190 to the motor 204 and/or other components of the lock 140 by one or more wires, leads, cables, or the like (not shown).

The lock 140 can include a motor assembly 202 and a gear assembly 210. The motor assembly 202 can be coupled with the gear assembly 210, for example, to actuate the gear assembly 210 for locking and/or unlocking. The motor assembly 202 includes a motor 204 and a drive shaft 206. The motor 204 is mechanically coupled to the drive shaft 206, and to move the drive shaft when the motor 204 is actuated. The motor 204 can include various types of electric motors, such as a DC motor or the like. In some embodiments, the motor 204 can be an "off the shelf" motor that can be coupled with the gear assembly 210. As shown in at least FIG. 4, the motor 204 can be mounted on a locking mount 208. The locking mount 208 is mounted within the receptacle 188, such as on a wall (e.g., the interior wall 189) of the receptacle 188. The locking mount 208 can extend inwardly from the interior wall 189 of the receptacle 188. The locking mount 208 can be configured to support one or more components of the motor assembly 202 and/or one or more components of the gear assembly 210.

The gear assembly 210 can include one or more gears, among other components. The gear assembly 210 includes a cam 212, a pinion gear 214, and a rack 216. At least a portion of the motor assembly 202 can be engaged with the gear assembly 210. For example, the drive shaft 206 can be engaged with the cam 212 and/or the pinion gear 214. In some embodiments, the cam 212 and the pinion gear 214 are positioned on the drive shaft 206. In some embodiments, the cam 212 is positioned adjacent the pinion gear 214. The cam 212 is coupled to the drive shaft 206 such that as the drive shaft 206 turns, the cam 212 will also move or turn. The pinion gear 214 is coupled to the cam 212 such that movement of the cam 212 causes movement of the pinion gear 214. In some embodiments, the cam 212 and the pinion gear 214 are integrally formed.

The lock 140 further comprises a micro-switch 222 disposed near the cam 212. In some embodiments, at least a portion of the cam 212 is configured to engage a micro-switch 222. As the cam 212 rotates, an extending portion of the cam 212 can engage the micro-switch 222, which can send a signal to the processor to stop the motor 204 when the portion of the cam 212 engages the micro-switch 222 (e.g., depresses at least a portion of the micro-switch). The micro-switch 222 can be positioned at least partially above the cam 212. In some embodiments, the micro-switch 222 is positioned entirely above the cam 212. In some embodiments, the micro-switch 222 is positioned adjacent the cam 212 at a side location. In some embodiments, the micro-switch 222 is configured to engage the cam 212 when the cam is positioned in an initial position. In some embodiments, the cam 212 is configured to engage the micro-switch 222 when the pinion gear 214 has completed a full revolution. In some embodiments, the cam 212 is configured to engage the micro-switch 222 at approximately the same time as, or after, the pinion gear 214 contacts the non-geared region of the rack 216. In some embodiments, the cam 212 is configured to engage the micro-switch 222 when the rack 216 is positioned in the ready-to-lock position. Accordingly, the use of the micro-switch 222 may advantageously reduce the power required to open the lock by stopping the motor 204 as soon as or shortly after it is no longer needed to continue turning the cam 212.

The pinion gear 214 has a plurality of teeth 224. The plurality of teeth 224 of the pinion gear 214 can include one, two, three, four, five, six, seven, eight, or nine or more teeth 224. The plurality of teeth 224 can extend radially from an outer perimeter of the pinion gear 214. The plurality of teeth 224 can be positioned along at least a portion of an outer perimeter of the pinion gear 214.

In some embodiments, the plurality of teeth 224 can be positioned along only a portion of the outer perimeter of the pinion gear 214. For example, the plurality of teeth 224 can be positioned along approximately 100 to 120 degrees of the perimeter of the pinion gear 214. In some embodiments, the plurality of teeth 224 can be positioned along 80 to 90 degrees, 90 to 100 degrees, 100 to 110 degrees, 110 to 120 degrees, 120 to 130 degrees, 130 to 140 degrees, or another portion up to 360 degrees, of the perimeter of the pinion gear 214, among other ranges therebetween. In some embodiments, the plurality of teeth 224 can be formed around one eighth, one quarter, one third, one half, or any other portion of the outer perimeter of the pinion gear 214. The portion of the pinion gear 214 not comprising the plurality of teeth 224 can be a smooth surface extending to a distance less than that of the top portion of one or more of the plurality of teeth 224. The positioning of the plurality of teeth 224 along a specific portion of the pinion gear 214 can desirably help to control unlocking of the lock 140. In some embodiments, the plurality of teeth 224 can engage the rack 216 to help to control unlocking of the lock 140.

The rack 216 can include a plurality of teeth 217 extending from a surface, such as a top surface of the rack 216. The plurality of teeth 217 can include one, two, three, four, five, six, seven, eight, or nine or more teeth 217. The plurality of teeth 217 can include the same number of teeth, or a similar number of teeth, as the plurality of teeth 224. In some embodiments, the plurality of teeth 217 can include less than or more than the number of teeth of the plurality of teeth 224.

The rack 216 can be a linear gear extending in a direction perpendicular to a rotational axis of the pinion gear 214. The rack 216 can be disposed adjacent to a side or a portion of the circumference of the pinion gear 214. The pinion can be moveably coupled to the door 187 and/or the locking mount 208, or to another component of the receptacle 188. As described in more detail below, the number and/or positioning of the plurality of teeth 224 of the pinion gear 214 can be desirably selected to cause the rack 216 to laterally translate a desired distance to open the door of the container.

The plurality of teeth 224 of the pinion gear 214 can be configured to engage with at least one of the plurality of teeth 217 of the rack 216, such as between a pair of teeth 217. For example, as the drive shaft 206 rotates, the cam 212 and the pinion gear 214 rotate. As the pinion gear 214 rotates, the teeth 224 of the pinion gear 214 engage with the teeth 217 of the pinion. As the pinion gear 214 is rotated when at least one of the teeth 224 engages with at least one of the teeth 217, the rack 216 is configured to translate laterally. For example, the pinion gear 214 can be rotated in a counter-clockwise direction. As the teeth 224 of the pinion gear 214 engage with the teeth 217 of the rack 216 and the pinion gear 214 is rotated in a counter-clockwise direction, the rack 216 can be translated along a line extending perpendicular to the axis of rotation of the pinion gear 214 (e.g., to the right in as shown in FIGS. 4 and 5).

As the rack 216 moves, the rack 216 can engage or disengage with an unlocking assembly 219. The unlocking assembly 219 can include an unlocking member 218 and a biasing member 220. The biasing member 220 can be a spring, such as a coil spring, an elastomeric member, or other resilient device. The biasing member 220 can be positioned adjacent an end of the unlocking member 218. The biasing member 220 can be positioned between the end of the unlocking member 218 and an unlocking portion 208A (see FIG. 5) of the locking mount 208. When the lock 140 is in the locked and/or partially locked position (e.g., FIG. 5), the biasing member 220 is in a compressed state.

Figure 5:
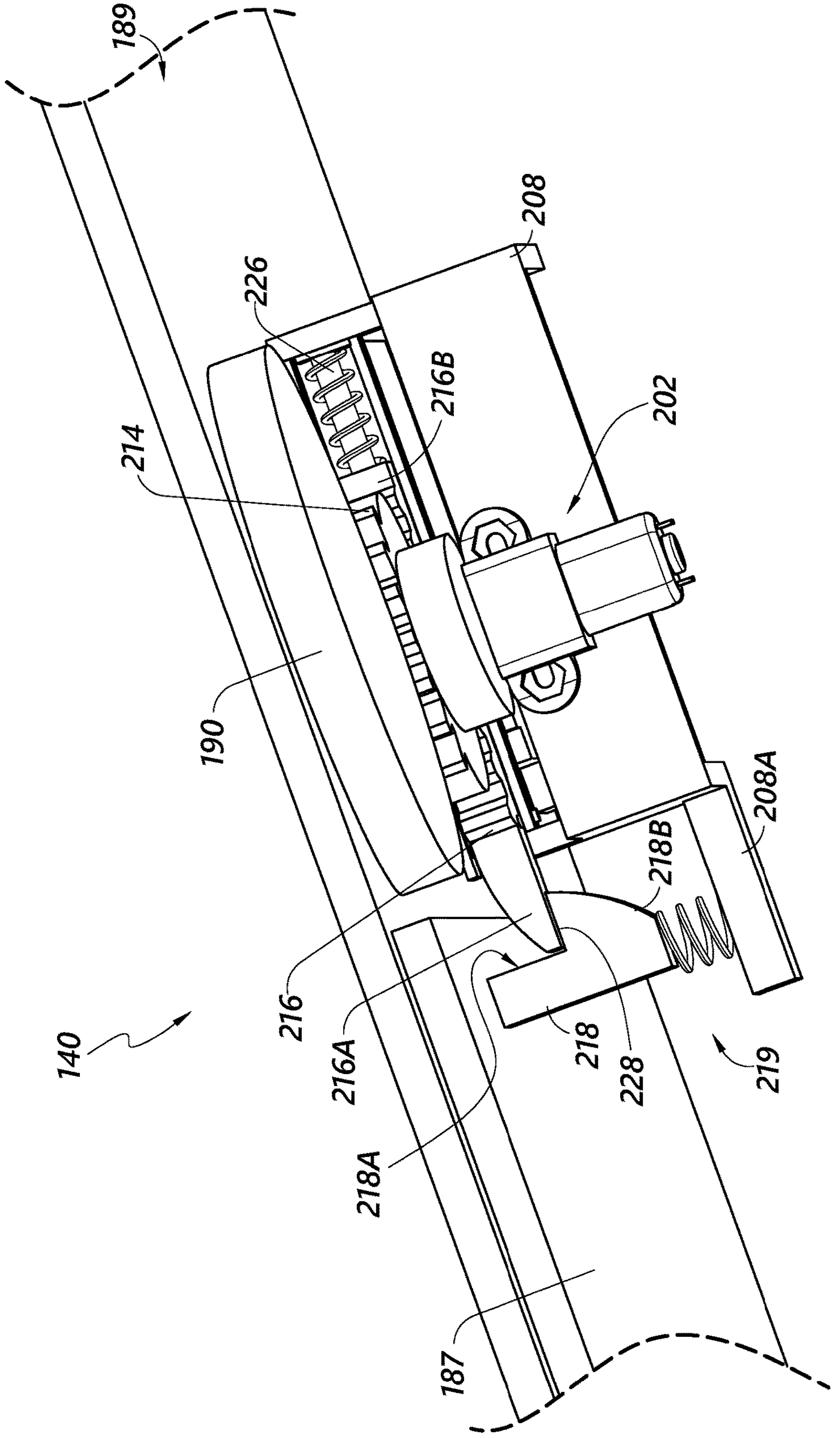
FIG. 5 is a top perspective view of the electronic lock of FIG. 4.

As shown in FIG. 5, the rack 216 can be positioned adjacent a rack biasing member, such as a spring 226. The spring 226 can include a coil spring, rubber member, or other material. The spring 226 can be positioned adjacent the rack 216 at one end and adjacent at least a portion of the locking mount 208 at the other end such that the spring 226 is positioned between at least a portion of the rack 216 and the locking mount 208. In some embodiments, the spring 226 surrounds at least a portion of the rack 216. In some embodiments, the spring 226 can surround a protrusion that extends from a second end portion 216B of the rack 216. The spring 226 can be positioned between the second end portion 216B and the locking mount 208. As the pinion gear 214 engages with the rack 216 and the rack 216 translates laterally, the rack 216 compresses the spring 226 against the locking mount 208.

The unlocking member 218 can be coupled with the door 187 of the receptacle 188. In some embodiments, the unlocking member 218 can be integrally formed with the door of the receptacle 188. The unlocking member 218 can extend away from the interior wall 189, such as towards the interior volume of the receptacle 188 when the door 187 is in the closed position.

In some embodiments, the unlocking member 218 can include a shelf portion 228. The shelf portion 228 can define a surface that is configured to contact at least a portion of the rack 216, such as a first end portion 216A. As shown in FIG. 5, when the lock 140 is in the locked position, the first end portion 216A engages with a side surface 218*a* of the unlocking member 218 and an inner side surface of the first end portion 216A can engage with an inner surface of the shelf portion 228. When the rack 216 translates laterally as the pinion gear 214 is rotated, the first end portion 216A is configured to slide along the surface of the shelf portion 228 away from the side surface 218*a* of the unlocking member 218. As the first end portion 216A slides beyond an edge of the surface of the shelf portion 228, the rack 216 ceases to retain the unlocking member 218, allowing the biasing member 220 to expand and push the door open.

As described above, the number and/or positioning of the plurality of teeth 224 of the pinion gear 214 can be desirably selected to translate the rack 216 a desired distance to open the door of the container. For example, the pinion gear 214 can be desirably geared to translate the rack 216 a predetermined distance (e.g., along the surface of the shelf portion 228) such that after the first end portion 216A slides beyond the edge of the surface of the shelf portion 228, the portion of the pinion gear 214 which has no teeth 224 rotates proximate the rack 216. When no teeth 224 of the pinion gear 214 are engaged with any teeth 217 of the rack 216, there is no force holding the rack 216 in the withdrawn position. This allows the spring 226 to release. The spring 226 is configured to push the rack 216 laterally in the opposite direction of the direction the rack 216 moved during the unlocking movement, and into a ready-to-lock position.

The pinion gear 214 can continue to rotate to its original position without applying a force to the rack 216 and pushing against the spring 226. In this way, the pinion gear 214 reduces the amount of power required to open the lock 140. By only exerting a force on the rack 216 over the portion of the pinion gear 214 having teeth, the receptacle 188 can be opened while exerting a minimum amount of force to unlock the lock 140.

As the door 187 is opened by the force of the biasing member 220, the rack 216 returns to its original position. To close the door 187, the door 187 is pushed closed, and the unlocking member 218 contacts the rack 216. A curved portion 218*b* of the unlocking member 218 contacts the rack 216. The curved portion 218*b* is curved to allow the unlocking member to slide along the rack 216. The curved portion 218*b* pushes laterally on the rack 216, compressing spring 226, moving the rack 216 enough to allow the unlocking member 218 to return to its position when the door is locked. Pushing the door 187 closed also pushes the unlocking member 218 against the biasing member 220. When the unlocking member 218 has been pushed against the biasing member 220 far enough, the shelf 228 clears the rack 216, and the rack 216 moves laterally to its former position aided by the force of the spring 226. The first end portion 216A contacts the shelf 228, and retains the locking member 218 in position, thereby locking the door 187.

Figure 6:
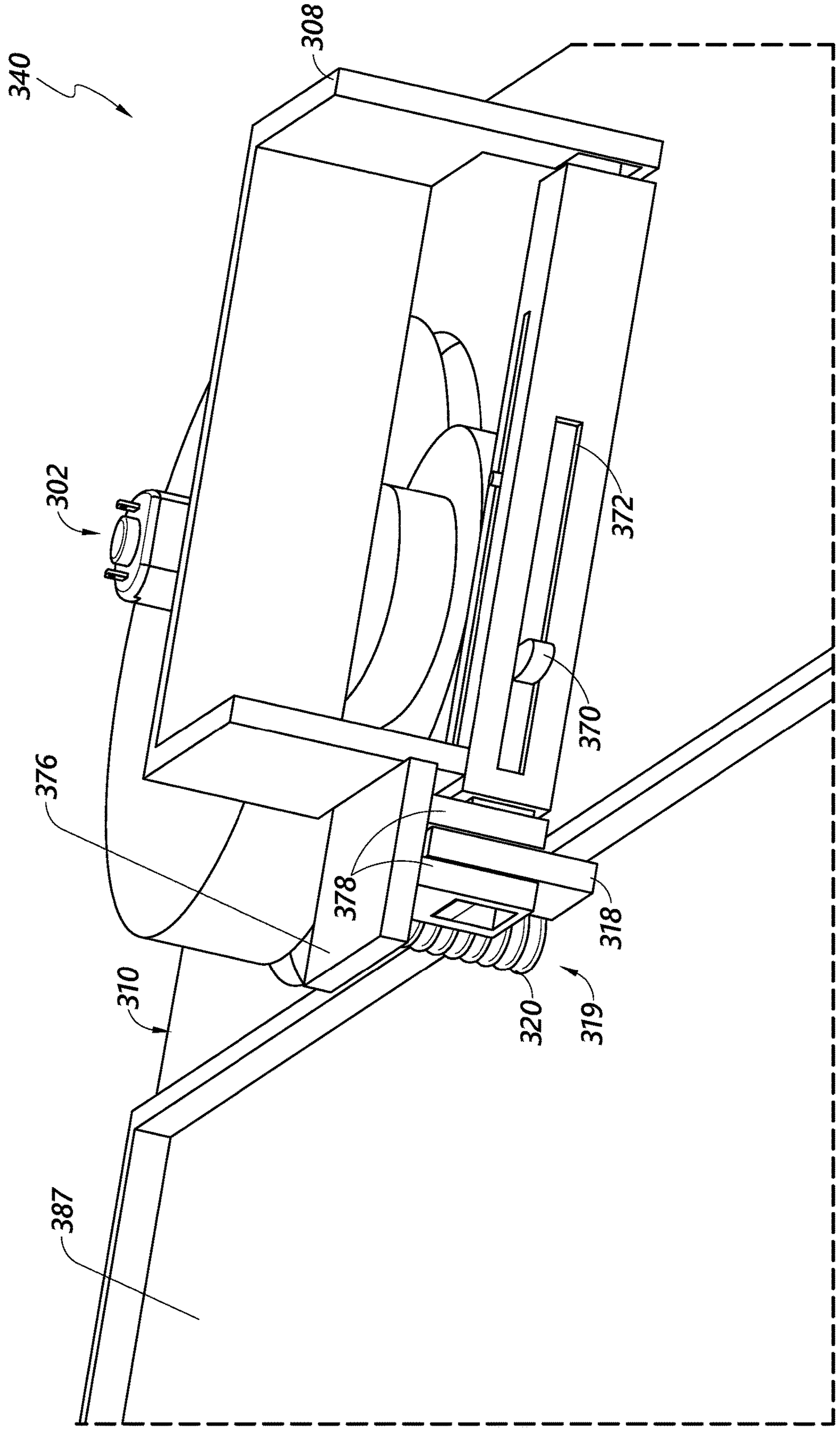
FIG. 6 is a bottom perspective view of an embodiment of an electronic lock disposed in an interior volume of a receptacle.
Figure 7:
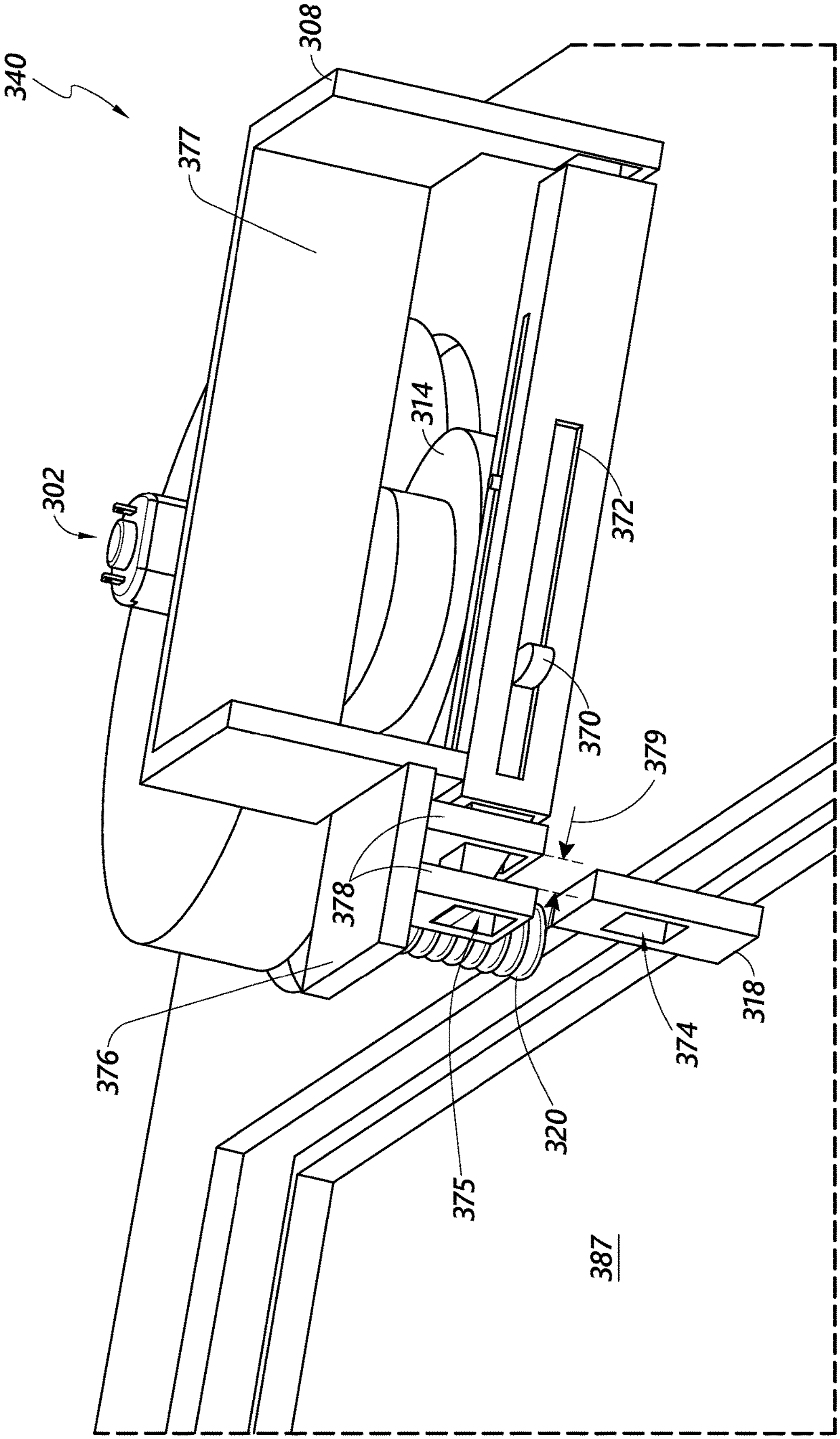
FIG. 7 is a bottom perspective view of the electronic lock of FIG. 6 in an unlocked position.
Figure 8:
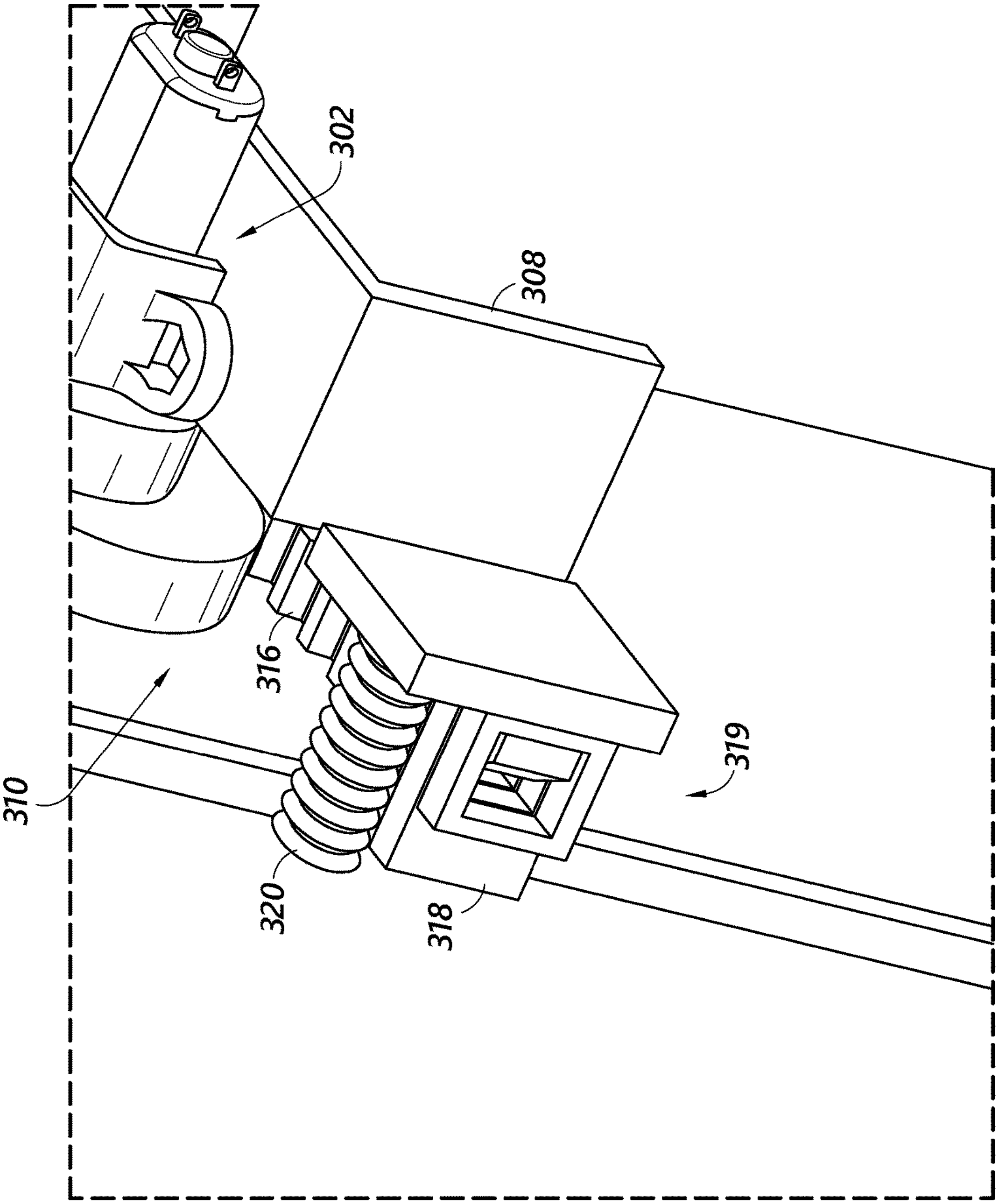
FIG. 8 is a side perspective view of the electronic lock of FIG. 6.

FIGS. 6-8 illustrate an exemplary embodiment of a lock 340. The lock 340 may be similar or identical to the lock 140 discussed above in many respects. Accordingly, numerals used to identify features of lock 340 are incremented to identify certain similar features of the lock 340. For example, as shown in FIG. 6, the lock 340 can include a motor assembly 302, a gear assembly 310, and an unlocking assembly 319 described above in connection with the lock 140. The lock 340 can include any one or a combination of the features of the lock 140.

As shown in FIGS. 6-8, the motor assembly 302 can be coupled with the gear assembly 310. The lock 340 can include a locking mount 308 that is configured to support at least a portion of the gear assembly 310 and/or at least a portion of the motor assembly 302. For example, the locking mount 308 can support at least a rack 316 of the gear assembly 310. The rack 316 can include a protrusion portion 370. The protrusion portion 370 can extend generally downwardly from the rack 316. The protrusion portion 370 can be configured to extend through a slot 372 in the locking mount 308. The slot 372 can be desirably shaped and sized to allow the rack 316 to translate along the slot 372 as the pinion gear 314 rotates and engages the rack 316. The slot 372 can have a length that is approximately equal to the desired distance of translation of the rack 316.

The unlocking assembly 319 can include an unlocking member 318 and a biasing member 320. The unlocking member 318 can be coupled with or integrally formed with a door 387 of the receptacle. In some embodiments, the unlocking member 318 can extend from the inner surface of the door of the receptacle towards the interior volume of the receptacle when the door is in the closed position (e.g., as shown in FIG. 8). The unlocking member 318 can be generally rectangular, among other shapes. The unlocking member 318 can have a cutout region 374 that is configured to receive at least a portion of the rack 316.

The locking mount 308 can include an unlocking portion 376 proximate the unlocking assembly 319. The unlocking portion 376 can extend from a main body portion 377 of the locking mount 308. The unlocking portion 376 can have a forward facing surface. The forward facing surface can include at least two extension members 378. The extension member 378 can be generally rectangular, among other shapes. The extension members 378 can be spaced apart along the forward facing surface by a distance 379. The distance 379 can be approximately equal to a width of the unlocking member 318. The extension members 378 can be spaced apart to define a receiving region that is configured to receive the unlocking member 318 when the door of the container is in the locked position.

As shown in FIG. 7, the extension members 378 can include a cutout region 375. The cutout region 375 can have a shape and/or size that is similar to or identical to the shape and/or size of the cutout region 374. The cutout region 374 of the unlocking member 318 can be configured to align with the cutout regions 375 when the lock 340 is in the locked position. The extension members 378 can desirably create a double-shear. The double-shear can advantageously enhance security of the lock 340 by requiring greater shear stress to break the lock 340.

As shown in at least FIGS. 6-8, the biasing member 320 can be coupled with the forward facing surface of the locking mount 308. The biasing member 320 can extend from the forward facing surface towards the door of the container. The biasing member 320 is configured to contact the door of the container when the lock 340 is in the locked position. In the locked position, a portion of the rack 316 extends through a first cutout region 375, through the cutout region 374 of the unlocking member 318, and through a second cutout region 375, thereby retaining the door 387 in place against the biasing member 320.

During an unlocking process, the motor causes rotation of the pinion gear 314, the pinion gear 314 engages the rack 316. Such engagement causes the rack 316 to translate laterally away from the unlocking assembly 319 against a biasing element (not shown). As the rack 316 translates laterally, the rack 316 slides through and out of the cutout region 374 and/or the cutout region 375, toward the main body portion 377 of the locking mount 308 to unlock the lock 340. The biasing member 320 releases as the rack 316 slides out of the cutout regions 374 and 375, and pushes the door 387 of the receptacle open (e.g., away from the interior volume of the receptacle).

To close the door 387, the unlocking member 318 is pushed against the rack 316. The rack 316 includes a curved surface on a first end which, when impacted by the unlocking member 318, causes the rack 316 to move laterally against a biasing force. When the unlocking member 318 is pushed into the space between the extension members 378, the cutout region 374 in the unlocking member 318 aligns with the cutout regions 375 in the extension members, and a portion of the rack 316 is allowed to move, urged by the biasing element, back into the cutout regions 374 and 375, thereby securing the door 387 in the locked position.

Figure 9:
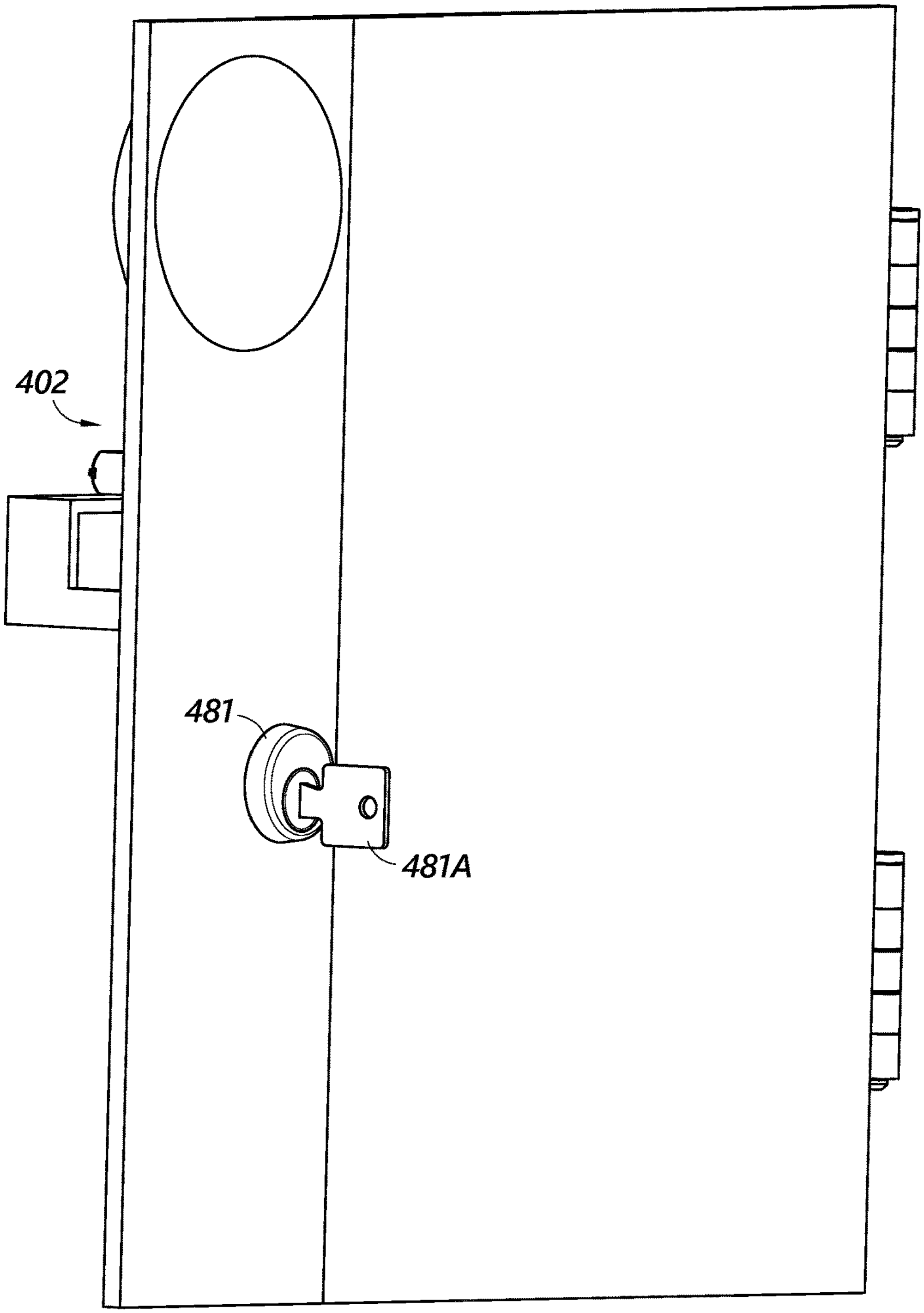
FIG. 9 is an exterior view of an embodiment of an electronic lock disposed in a door of a receptacle.
Figure 10:
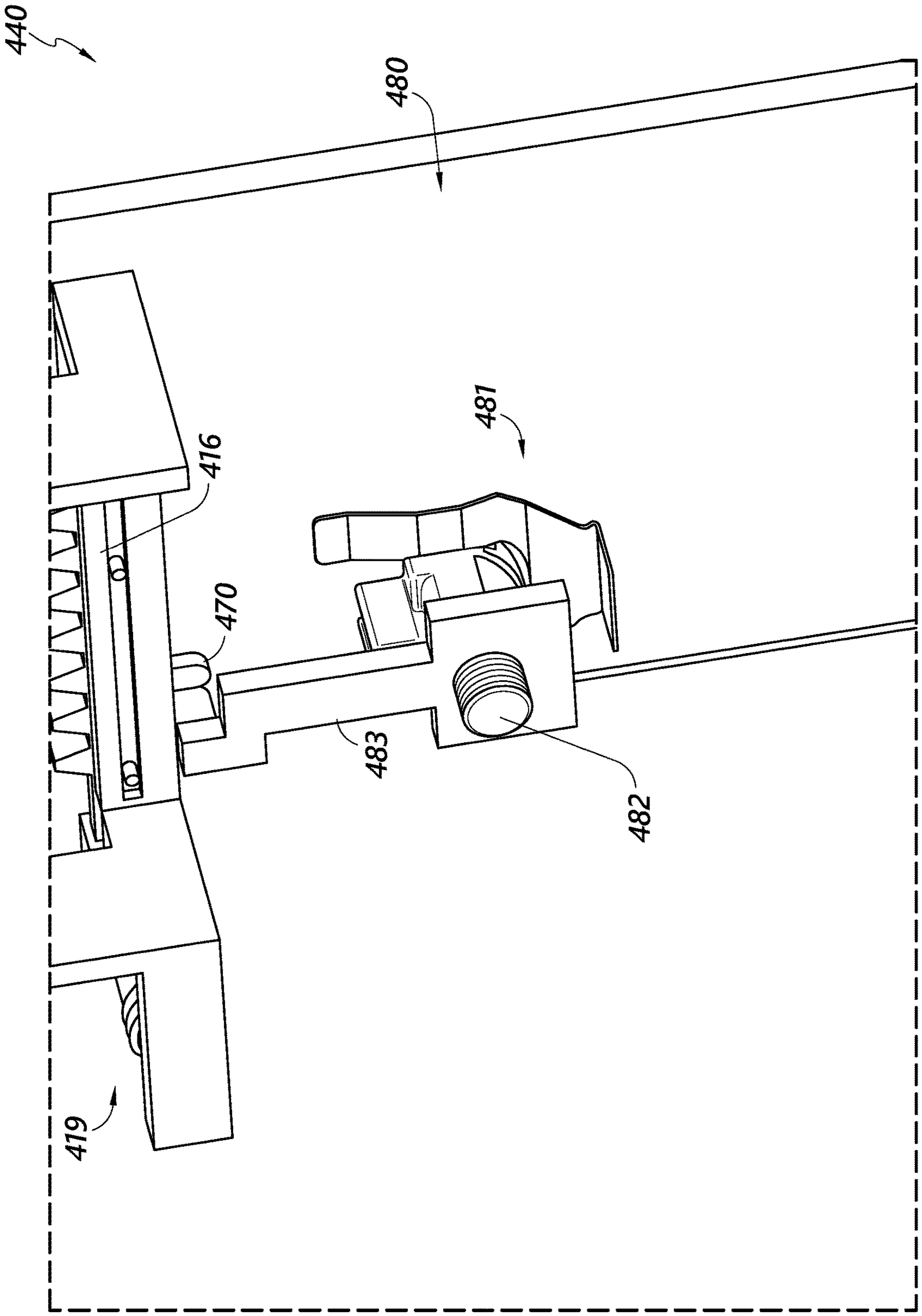
FIG. 10 is a perspective view of an embodiment of an electronic lock disposed in an interior volume of a receptacle.

FIGS. 9-10 illustrate another embodiment of a lock 440. The lock 440 is similar or identical to the lock 140, 340 discussed above in many respects. Accordingly, numerals used to identify features of lock 440 are incremented to identify certain similar features of the lock 440. For example, as shown in FIGS. 9-10, the lock 440 can include a motor assembly 402, a gear assembly (not shown), and an unlocking assembly (not shown) as described above in connection with the lock 140, 340. The lock 440 can include any one, or any combination, of the features of the lock 140, 340.

As shown in FIGS. 9-10, the lock 440 can include an override system 480. The override system 480 can include a key lock, such as a standard key lock 481 that can be unlocked with a key 481A. The key lock 481 can include a locking bolt 482 to engage the receptacle and secure the key lock 481 to the receptacle. The key lock 481 can include an unlocking feature 483 positioned near an end portion of the locking bolt 482. The unlocking feature 483 can be configured to contact a protrusion portion 470 of the rack 416 or another component of unlocking assembly 419. The unlocking feature 483 is configured to rotate, such as in a counterclockwise direction, when the key 481A is inserted into the key lock 481 and rotated. The unlocking feature 483 is configured to draw back the rack 416 when the unlocking feature 483 engages the protrusion portion 470 of the rack 416, thereby moving the rack 416 against a biasing element, and unlocking the lock 440, similar to the movement of the rack described elsewhere herein. Such engagement can manually override the motor assembly 402 and/or the gear assembly 410. Such configuration can desirably provide a manual override in situations in which the motor assembly 402 and/or the gear assembly 410, among other components of the lock 440 malfunction, are damaged, or otherwise do not work properly. In some embodiments, the unlocking feature 483 can be positioned near or in contact with the locking bolt 482 so as to prevent operation of the lock by impinging movement of the locking bolt 482. This can be used to disable a lock, or to securely lock the receptacle even when an appropriate mobile device 110 attempts to open the lock.

Figure 11:
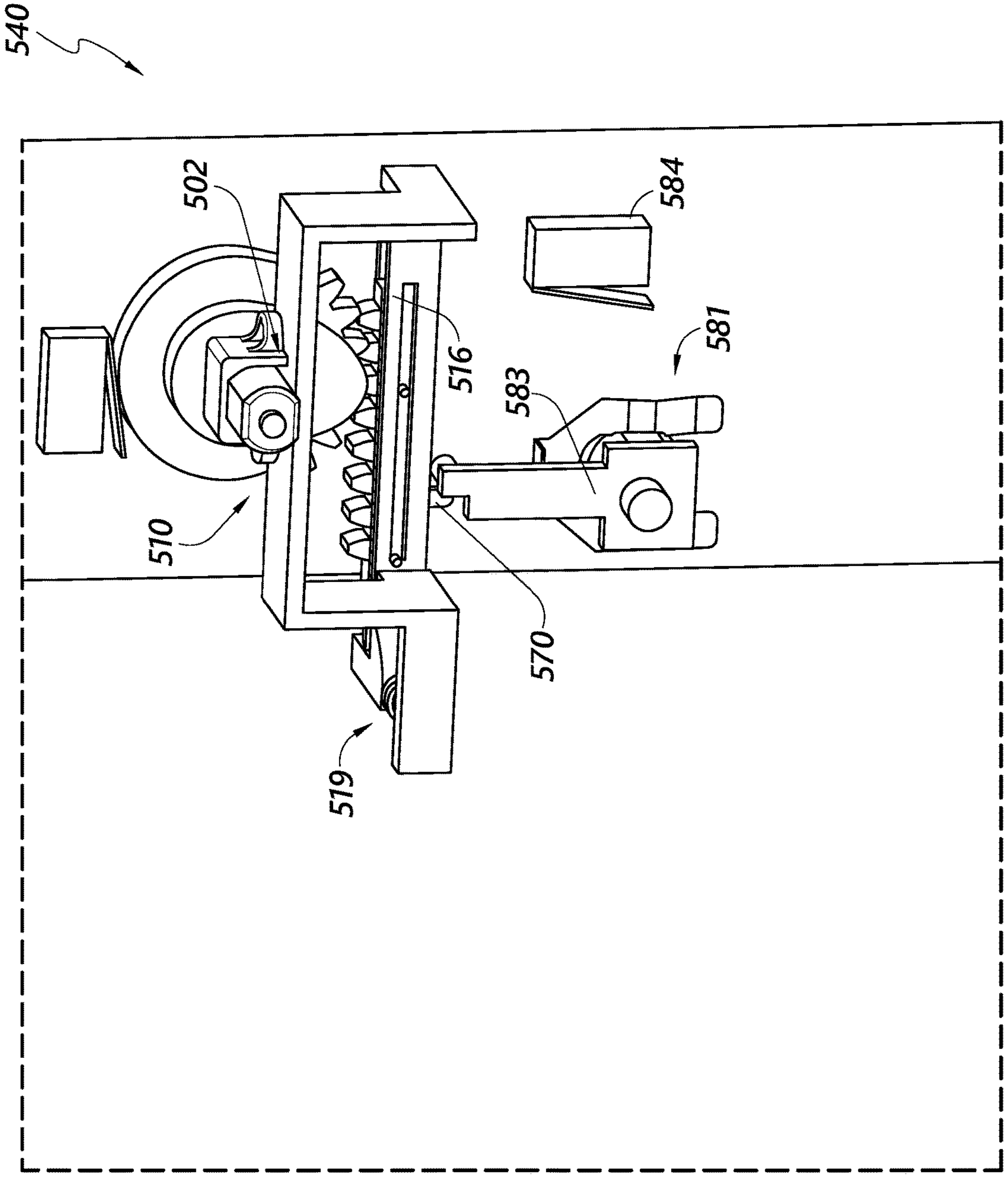
FIG. 11 is a rear perspective view of an embodiment of an electronic lock disposed in an interior volume of a receptacle.

FIG. 11 illustrates an embodiment of a lock 540 which includes a dual unlock requirement. The lock 540 is similar or identical to the lock 140, 340, 440 discussed above in many respects. Accordingly, numerals used to identify features of lock 540 are incremented to identify certain similar features of the lock 540. For example, as shown in FIG. 11, the lock 540 can include a motor assembly 502, a gear assembly 510, and an unlocking assembly 519 described above in connection with the lock 140, 340, 440. The lock 540 can include any one, or any combination, of the features of the lock 140, 340, 440.

As shown in FIG. 11, the lock 540 can include one or more security features that can be used instead of and/or in addition to the security features of the lock 540 described above. A key lock 581 includes an unlocking feature 583. The unlocking feature 583 extends from the key lock 581 to contact a protrusion portion 570 of the rack 516 when the lock 540 is in the locked position. Such configuration can block the rack 516 from being translated laterally to unlock the lock 540. The unlocking feature 583 contacts the protrusion portion 570 to prevent the lateral unlocking movement of the rack 516 (movement to the right in FIG. 11). The unlocking feature 583 of the key lock 581 must be first rotated away from the protrusion portion 570 to allow the rack 516 to move laterally and unlock as described elsewhere herein. Such configurations can desirably enhance the security of the lock 540.

In some embodiments, the lock 540 can include a micro-switch 584. The micro-switch 584 can be configured to be activated by contact with the unlocking feature 583 as the unlocking feature is rotated (clockwise as shown in FIG. 11) as the key lock 581 is turned. For example, the unlocking feature 583 can be rotated to contact the micro-switch 584. In some embodiments, contact between the unlocking feature 583 and at least a portion of the micro-switch 584 can activate the lock 540 and cause the unlocking procedure to occur. In some embodiments, contact between the unlocking feature 583 and at least a portion of the micro-switch 584 allows power to be supplied to the lock 540 from the inductive power transfer unit. In some embodiments, the lock 540 is configured such that the lock 540 may not receive power until the unlocking feature 583 activates the micro-switch 584. Such configurations can desirably enhance the security of the lock 540 by requiring an additional credential, such as a key, in addition to a mobile device, fob, and/or other actuating device. In some embodiments, the lock control circuitry will not function, or will not allow the unlock process to begin until the micro-switch 584 is activated. This configuration can be useful to require a two-part unlocking requirement. First, the carrier desiring to unlock the lock 540 will need to have a key to unlock the key lock 581, and will need to have a mobile device with the proper credentials to operate the electro-mechanical portion of the lock 540.

Figure 12:
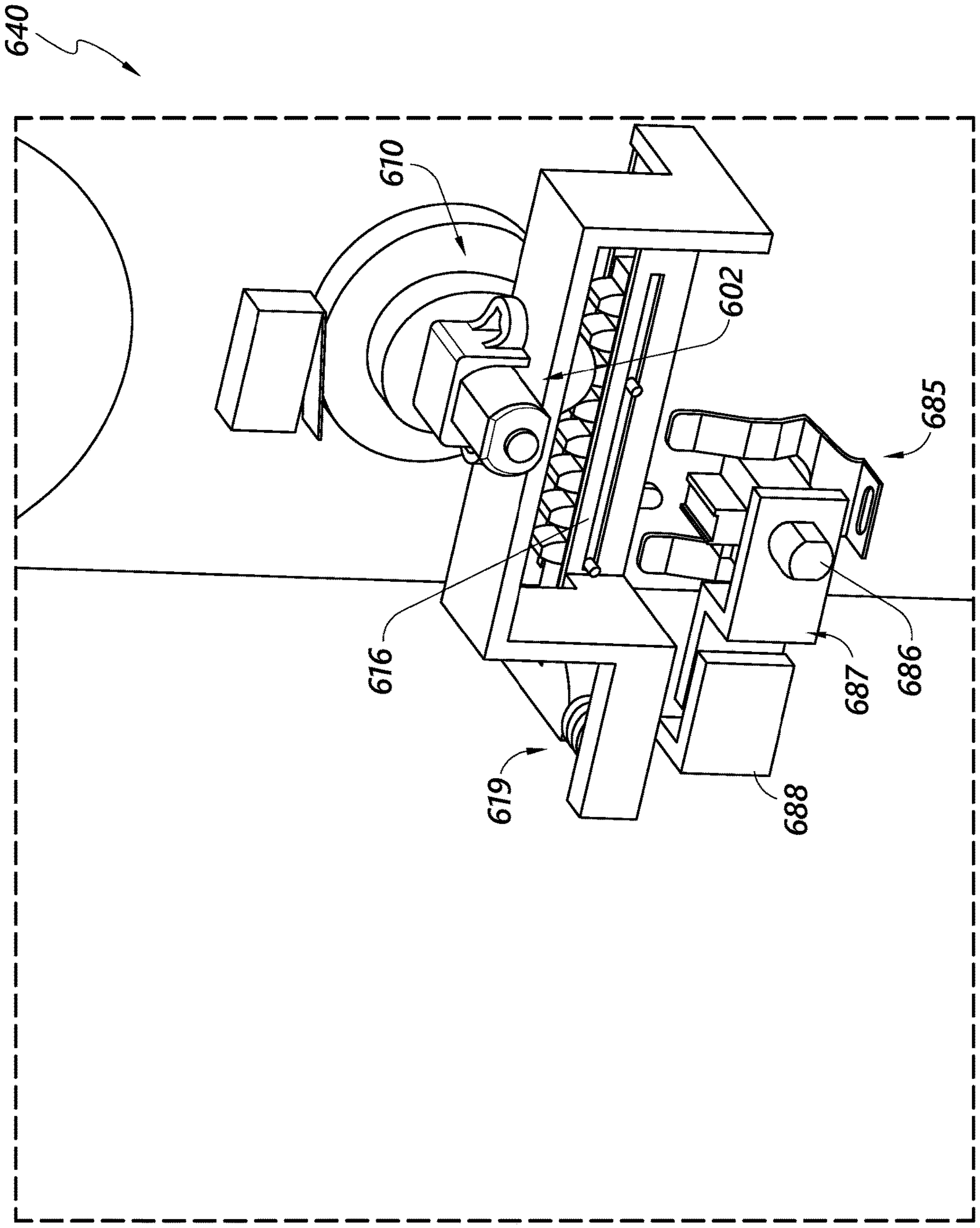
FIG. 12 is a rear perspective view of an embodiment of an electronic lock disposed in an interior volume of a receptacle.

FIG. 12 illustrates an exemplary embodiment of a lock 640. The lock 640 is similar or identical to the lock 140, 340, 440, 540 discussed above in many respects. Accordingly, numerals used to identify features of lock 640 are incremented to identify certain similar features of the lock 640. For example, as shown in FIG. 12, the lock 640 can include a motor assembly 602, a gear assembly 610, and an unlocking assembly 619 described above in connection with the lock 140, 340, 440, 540. The lock 640 can include any one, or any combination, of the features of the lock 140, 340, 440, 540.

As shown in FIG. 12, the lock 640 can include a secondary lock 685. The secondary lock 685 can include a secondary locking bolt 686 and a secondary unlocking feature 687, among other components. The secondary unlocking feature 687 can be configured to engage with a secondary unlocking member 688 that extends from the door of the receptacle. The secondary unlocking feature 687 will prevent the receptacle door from being opened, regardless of the position of the rack 616, unless the secondary lock 685 is rotated to move the secondary unlocking feature 687 out of contact with the secondary unlocking member. This configuration can be useful to require a two-part unlocking requirement. First, the carrier desiring to unlock the lock 640 will need to have a key to unlock the secondary lock 685, and will need to have a mobile device with the proper credentials to operate the electro-mechanical portion of the lock 640.

In some embodiments, power may not be supplied to the secondary lock 685 and/or the motor assembly 602, the gear assembly 610, and/or the unlocking assembly 619 may not be activated until the secondary lock 685 is unlocked. This can be accomplished by connecting the secondary lock 685 to an electric or electronic system as part of the logic of the lock. In some embodiments, the secondary lock 685 may break a circuit, or may provide an input into logic for unlocking the door. In some embodiments, even if the motor assembly 602, the gear assembly 610, and/or the unlocking assembly 619 is activated, the door to the receptacle may not open unless the secondary lock 685 is unlocked. Such configurations can desirably enhance the security of the lock 640.

Figure 14:
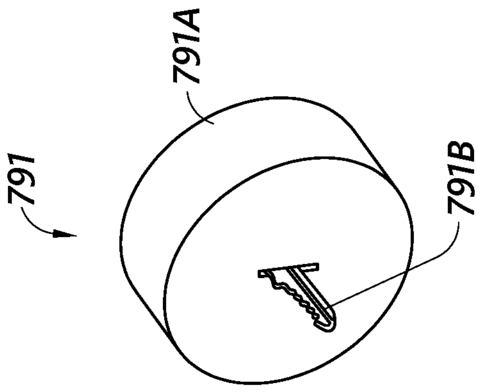
FIG. 14 depicts an embodiment of a power receiver and a key receptacle of a lock.
Figure 13:
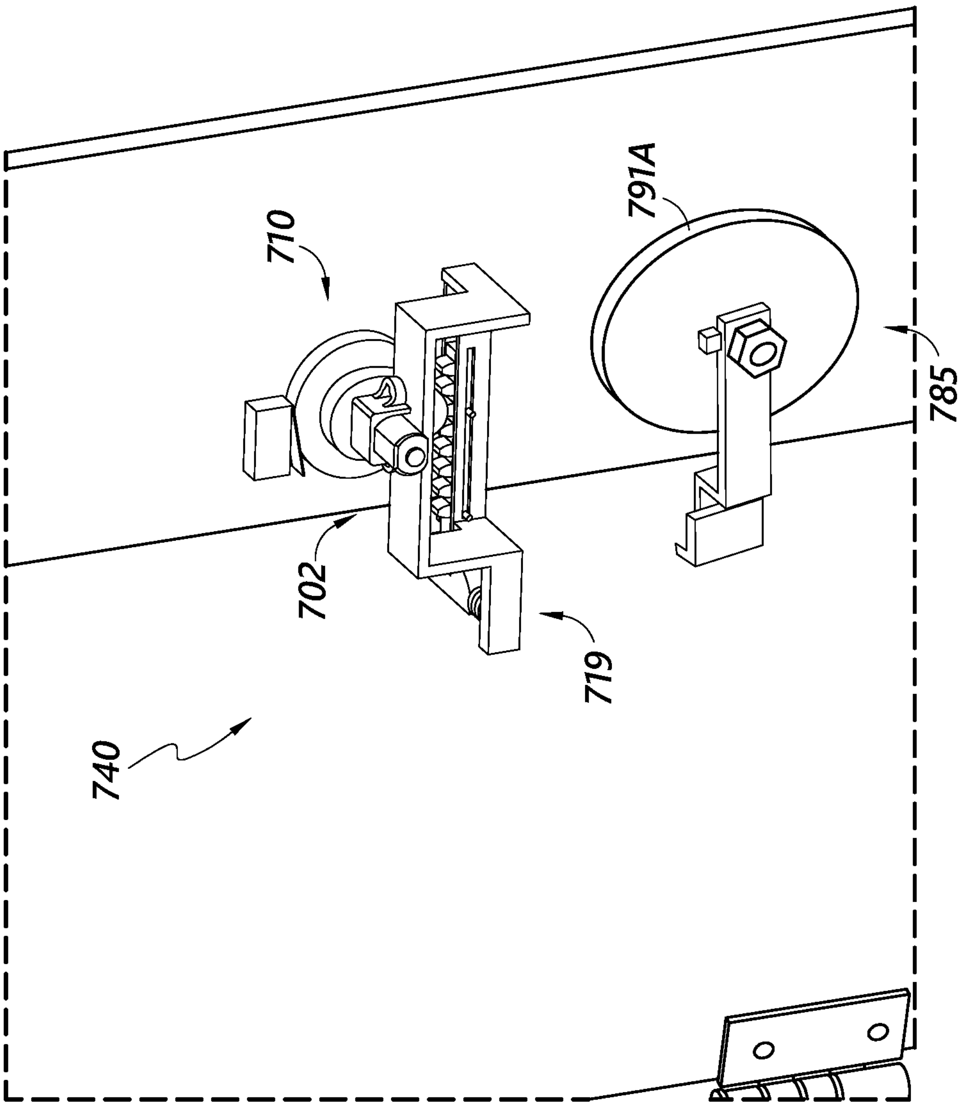
FIG. 13 is a rear perspective view of an embodiment of a lock disposed in an interior volume of a receptacle.
Figure 15:
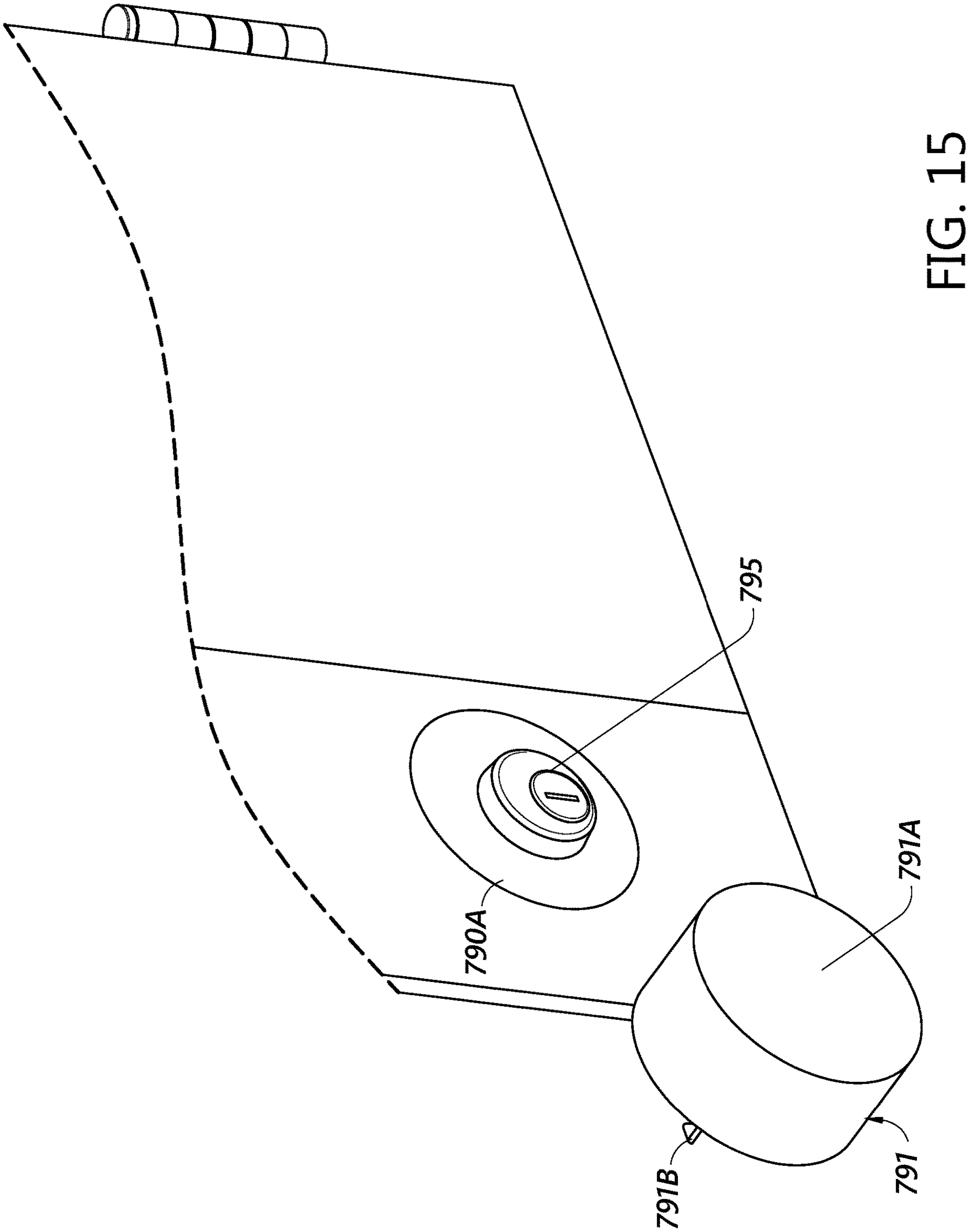
FIG. 15 depicts the power receiver and the key receptacle of FIG. 14 disposed in a door of a receptacle.

FIGS. 13-15 illustrate another embodiment of a lock 740. The lock 740 is similar or identical to the lock 140, 340, 440, 540, 640 discussed above in many respects. Accordingly, numerals used to identify features of lock 740 are incremented to identify certain similar features of the lock 740. For example, as shown in FIGS. 13-15, the lock 740 can include a motor assembly 702, a gear assembly 710, and an unlocking assembly 719 described above in connection with the lock 140, 340, 440, 540, 640. The lock 740 can include any one, or any combination, of the features of the lock 140, 340, 440, 540, 640.

As shown in FIGS. 13-15, the lock 740 can include a secondary lock 785. In some embodiments, as shown in at least FIGS. 13-15, the power receiver 790 on the receptacle can be integrated with a key receptacle 795. A powered key 791 can be used to unlock such a lock. The powered key 791 can include an inductive power transfer unit **791*a* and a key portion 791*b*. The key portion 791*b* is inserted into the key receptacle 795. Doing so brings the inductive power transfer unit 791*a* in proximity to or contact with the power receiver 790. The powered key 791 can provide inductive power to the lock 740. The powered key 791 can then be turned to operate the secondary lock 785, and allow the door to unlock as described elsewhere herein. Such configurations can allow the power to be supplied to the lock 740 at the same time or shortly after the lock 740** is activated. Such configurations can desirably save time and/or allow the container to be more efficiently unlocked.

Figure 16:
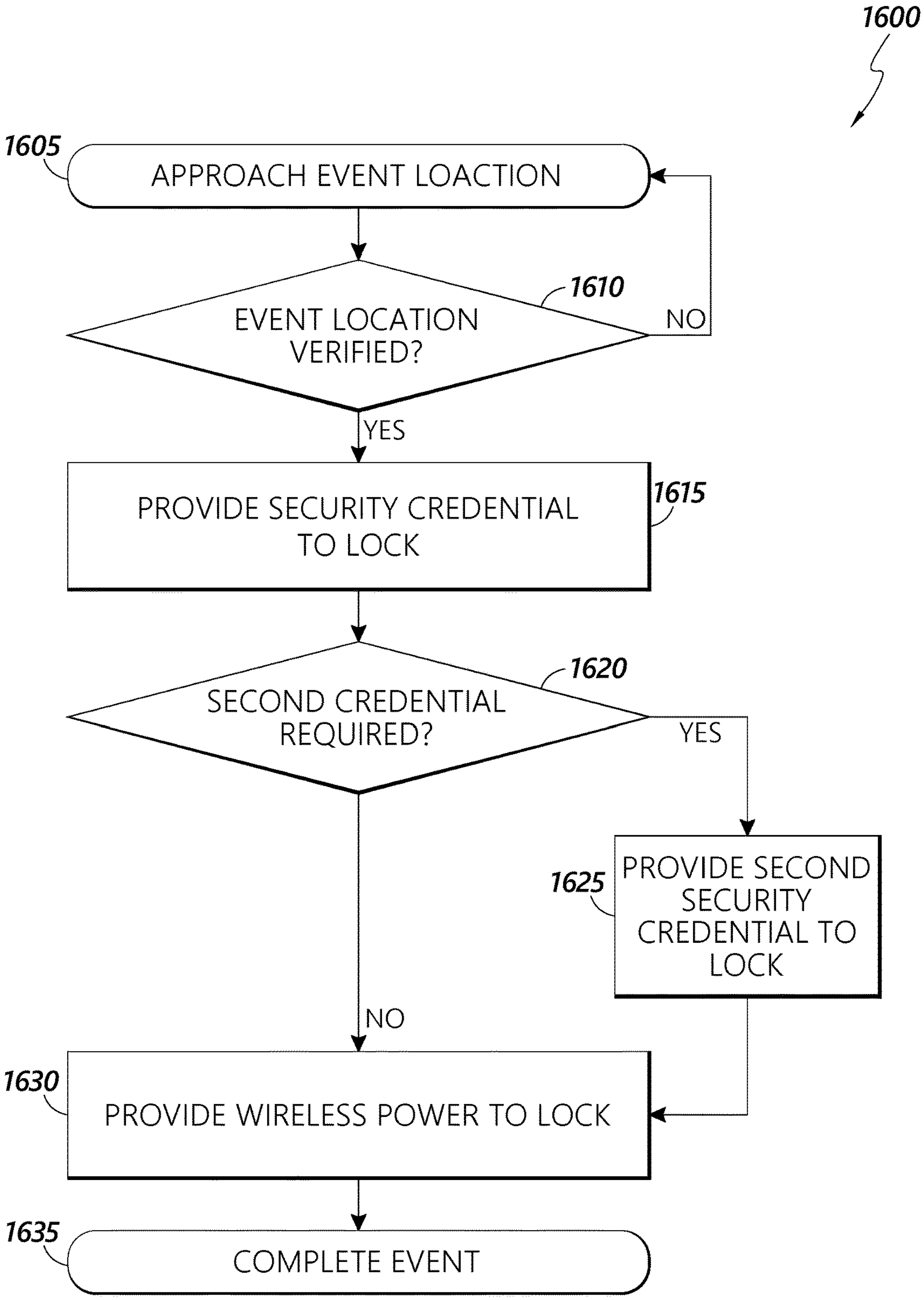
FIG. 16 is a flow chart depicting an example method of completing a delivery or pick-up event.

FIG. 16 is a flow chart depicting an example process 1600 for completing an event, such as a delivery or a pick-up, at a delivery point using any of the locks described herein. A process 1600 can be implemented any number of times as necessary as the carrier delivers to multiple delivery points along a predetermined route traveled by an item carrier. The process 1600 can be performed by an item carrier using a mobile device such as the mobile device 110 described herein, which may be in communication with additional components as described above with reference to FIG. 1. For example, the process 1600 can be performed at least in part by components such as the mobile device 110, the databases 120, etc. It will be appreciated that some or all steps of the process 1600 can be performed locally and/or remotely. The lock at the delivery point may be any one or combination of the locks 140, 340, 440, 540, 640, 740 described herein.

The process 1600 begins at block 1605 when the item carrier approaches an event location. The event location may be, for example, a delivery point, item receptacle, mailbox, residence, business, or other location at which an item is to be picked up or delivered. The item carrier may approach the event location based on a sequence of locations known to the item carrier, assigned to the carrier, such as a standard carrier route, and/or based on a prompt provided by the mobile device 110. As the carrier moves along the route, the mobile device 110 can record location data, such as GPS breadcrumb data, store the location data, and transmit the location data to remote computer or server. For example, the mobile device 110 may display to the item carrier a list of locations for deliveries and/or pickups along the item carrier's route. In another example, the mobile device 110 may display to the item carrier an address or other location indicator corresponding to the next delivery or pick-up along the route. When the item carrier and mobile device have approached the event location, the process 1600 continues to decision state 1610.

At decision state 1610, the mobile device 110 attempts to verify the event location. For example, the mobile device 110 can identify its location and determine whether the identified location is within a geofence corresponding to the event location. Verification can be initiated, for example, by the item carrier selecting an option displayed on a display of the mobile device 110. The mobile device 110 can identify its location based on a GPS signal or other positioning signal. The identified location can then be compared with the coordinates the geofence set around or corresponding to the event location, such as the delivery point. Geofence information may be stored within the mobile device 110, such that the comparison with the identified location can be performed at the mobile device 110, and/or may be stored remotely, such as in the geofence database 121 depicted in FIG. 1. In some embodiments, the mobile device 110 can send its identified location, in association with an identifier of the delivery or pick-up event, to a server associated with the geofence database 121, where the validation step may be performed, and a result can be sent back to the mobile device 110. If the mobile device 110 determines that it is not at the appropriate location for the event (e.g., at a wrong address, outside the geofence, etc.), the process 1600 returns to block 1605 until the item carrier arrives at the correct location. In some embodiments, the mobile device 110 may provide a notification to the item carrier, such as an audible or visible message, indicating that the location is incorrect. If the mobile device 110 determines that it is at the correct location for the delivery or pick-up event, the process 1600 continues to block 1615.

In some embodiments, the validation step may include a verification of the carrier's location information, for example, the carrier's GPS breadcrumb data. The verification can include a check of one or more of the databases 120, or a separate database having carrier route information therein, to determine whether the carrier or the mobile device 110 which is at the event location has been moving along the scheduled or predetermined carrier route, as determined by the GPS breadcrumb data. If the mobile device 110 GPS breadcrumb data indicates that the mobile device 110 had been moving along the carrier's proper or assigned route prior to the arrival at the event location, then the mobile device 110 can be verified. If the GPS breadcrumb data does not indicate that the mobile device 110 had been moving along the carrier's proper or assigned route prior to arriving at the event location, the verification may be withheld. Such a situation may indicate that the mobile device 110 has been stolen or taken from a carrier, or that there is an anomaly in the carrier's route which suggests that the mobile device 110 being used to request access to the receptacle at the event location has been compromised or is suspect.

If the event location is not verified, the process 1600 returns to block 1605 and no a security credential is not issued to the mobile device 110 and/or the electronic lock.

At block 1615, a security credential is provided to an electronic lock at the event location. The electronic lock may be any of the locks 140, 340, 440, 540, 640, 740 described herein. To provide the security credential, the item carrier can place the mobile device 110 in proximity to the lock, such that the mobile device 110 can transmit the security credential to a receiver, such as the power receiver 190, of the lock. The mobile device 110 can provide an initial wireless power transfer to power components of the electronic lock so the electronic lock can receive and/or verify the security credential. The security credential may be retrieved locally from the system memory 163 of the mobile device 110 and/or remotely from the lock database 122. When the security credential has been provided to the lock, the process 1600 continues to decision state 1620. The security credential can be provided to the lock during the wireless power transfer as described elsewhere herein. The security credential can be transmitted by a wireless signal, such as near field communication, Bluetooth low energy, cellular, or other RF or electromagnetic spectrum signal.

At decision state 1620, the system determines whether a second credential is required. A second credential may be required in certain areas, for certain types of receptacles, such as cluster box units, where a higher level of security is required, or in any other desired situation. In some embodiments, the determination may occur at the mobile device 110. For example, the mobile device 110 may receive a signal from the electronic lock indicating that a second security credential is required. In another example, information indicating that the lock is a two-credential lock may be stored locally in the system memory 163 of the mobile device 110 and/or remotely in the lock database 122. If it is determined that a second credential is required, the method continues to block 1625. If it is determined that a second credential is not required, the method continues to block 1630.

At block 1625, the second security credential is provided to the lock. In some embodiments, the second security credential can be transmitted from the mobile device 110 to the power receiver 190 of the electronic lock. In some embodiments, the second security credential can be provided from a secondary device. For example, the item carrier may additionally carry a fob 150 storing a secondary security credential and configured to transmit the secondary security credential (e.g., the fob may transmit the credential based on proximity to the mobile device 110, proximity to the lock, by activating a button or switch on the fob, etc.). In some embodiments, the second security credential can comprise a physical key which can be inserted in a key lock component of the electronic lock. When the second security credential has been provided, the method continues to block 1630. In some embodiments, decision state 1620 can step 1625 can be omitted from the process 1600.

At block 1630, the system provides an unlock signal to the lock. The mobile device 110 and/or the fob 150 can be configured to wirelessly transfer power to the power receiver 190 of the electronic lock. The electronic lock can use the received electrical power to actuate its motor or other unlocking mechanism, as described elsewhere herein. After wireless power has been provided to the lock and the lock has opened, the process 1600 continues to block 1635. When the security credentials are supplied to and accepted, the lock logic can cause the transferred power from the fob and/or the mobile device to power the lock.

At block 1635, the item carrier terminates the process 1600 by completing the delivery or pick-up event. For example, if the event is a delivery, the item carrier places the item to be delivered into the receptacle or other space secured by the electronic lock and closes the door to lock the receptacle with the item inside. If the event is a pick-up, the item carrier retrieves an item from the interior of the receptacle and closes the door to secure the empty receptacle. When the event has been completed, the process 1600 terminates, and can begin again at block 1605 the next time an item is to be picked up or delivered.

Figure 17:
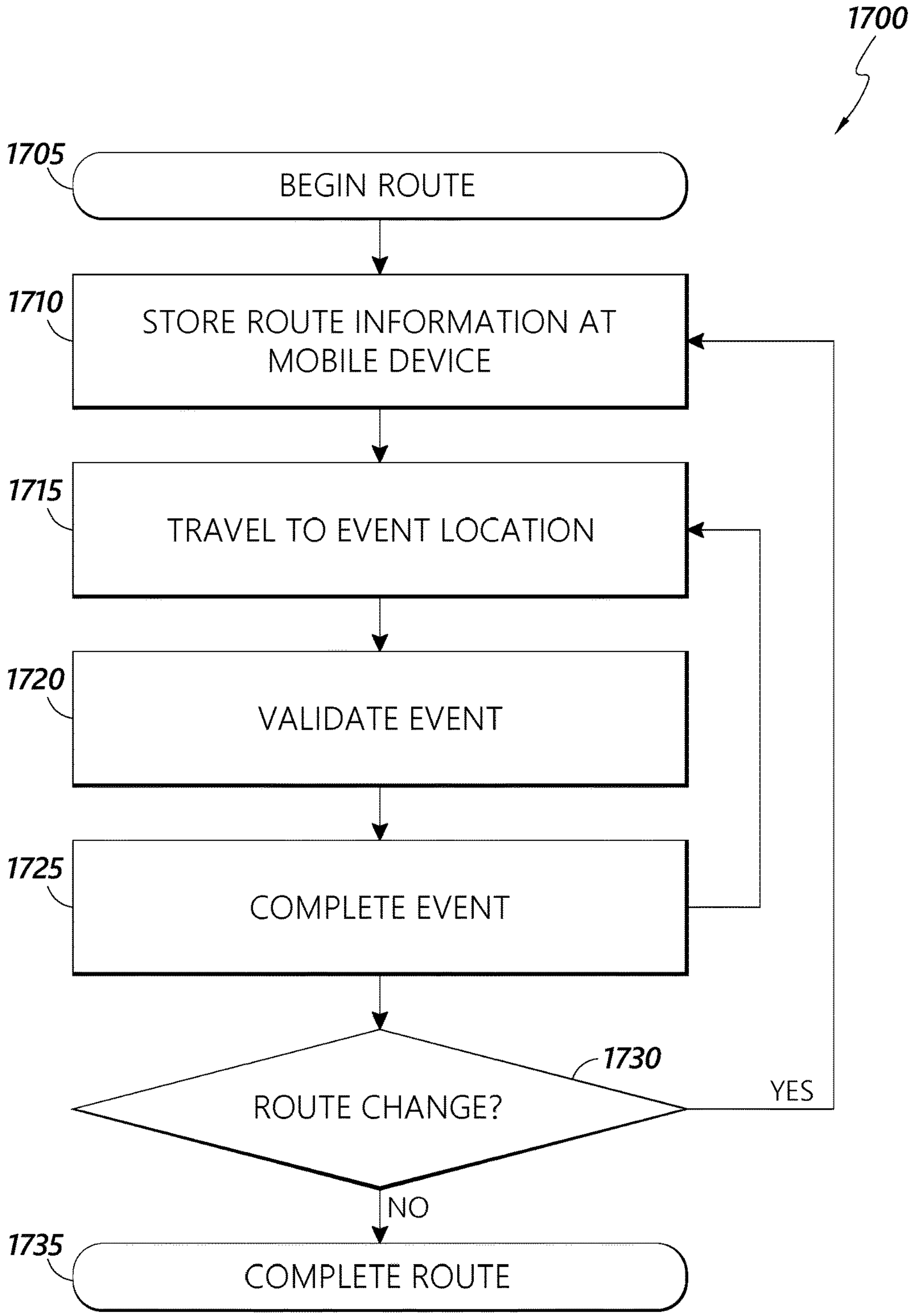
FIG. 17 is a flow chart depicting an example method of completing a route of an item carrier.

FIG. 17 is a flow chart depicting an example process for completing a route of an item carrier, including one or more pick-up and/or delivery events. A process 1700 can be implemented any number of times, e.g., daily, along a predetermined route traveled by an item carrier. The process 1700 can be performed by an item carrier using a mobile device such as the mobile device 110 described herein, which may be in communication with additional components such as databases 120, as described above with reference to FIG. 1. For example, the process 1700 can be performed at least in part by components such as the mobile device 110, the databases 120 (e.g., the geofence database 121 and the lock database 122), etc. It will be appreciated that some or all steps of the process 1700 can be performed locally and/or remotely. The locks at the event locations may be any one or combination of the locks 140, 340, 440, 540, 640, 740 described herein.

The process 1700 begins at block 1705 when the item carrier begins the daily route delivery process. For example, block 1705 can occur when the item carrier arrives at a distribution facility to begin working. The item carrier may retrieve a mobile device 110 to be used for deliveries and pick-ups along the route, and/or may retrieve a set of items to be delivered. In some embodiments, block 1705 may occur away from a distribution facility, for example, when an item carrier leaves a delivery vehicle to complete a group of delivery and/or pick-up events on foot.

At block 1710, route information is stored at the mobile device 110. The route information can include a list of events, actions such as deliveries and/or pick-ups associated with each event, information identifying the items to be delivered and/or picked up, information identifying an electronic lock associated with each event, one or more security credentials to be provided to each electronic lock, geofence data indicating the correct location for each event, or other route information. The route information may further indicate an ordered sequence of the events, walking directions, or other guiding information to direct the item carrier along the route. The route information may be obtained, for example, from databases 120 such as the geofence database 121, lock database 122, or other data source. The route information may be transferred to the mobile device 110 via a wired or wireless connection, for example, through a docking station for the mobile device 110, a local area wireless network, via the internet, etc. When the route information has been stored, the process 1700 continues to block 1715.

At block 1715, the item carrier travels with the mobile device 110 to an event location. For example, the item carrier may be directed by the mobile device 110, which may provide an audio or visual notification indication an address, driving directions, walking directions, a photo of the location, or other indicator of the event location. In some embodiments, the item carrier may travel to the event location based on the item carrier's own knowledge or memory, such as by traveling between regular stops on a route frequently traveled by the item carrier. When the item carrier and the mobile device 110 arrive at the event location, the process 1700 continues to block 1720.

At block 1720, the event is validated. Exemplary methods of event validation are described above with reference to block 1610 of FIG. 16. The mobile device 110, alone or in communication with one or more other components, determines if the item carrier is in a correct location to complete the event. In some embodiments, other event aspects may be verified. For example, the item carrier may scan a receptacle and/or an item to be delivered at the mobile device 110, and the mobile device 110 can determine if the receptacle and/or item are the correct receptacle and/or item corresponding to the delivery event. If the location or other event aspect is not correct, the process 1700 remains at block 1720 until the item carrier arrives at the correct location and/or resolves any other error, such that the event can be verified. If the location and/or any other event aspect is verified, the process 1700 continues to block 1725.

At block 1725, the event is completed. As described above with reference to FIG. 16, the actions performed at block 1725 can include providing one or more security credentials and/or electrical power to the electronic lock to cause the lock to open, placing an item to be delivered into the receptacle, removing an item to be picked up from the receptacle, and/or closing a door of the receptacle to secure the receptacle. After the event is completed, the process 1700 can return to block 1715, where the item carrier travels to a subsequent event location along the route, such as the next pick-up or delivery point.

At decision state 1730, the mobile device 110 can detect a route change. In some embodiments, an item carrier can select a route change option on the mobile device 110, indicating that the item carrier will switch to a different route from the route originally stored in the mobile device 110. In another example, a route change may be selected remotely, such as by a manager or supervisor, and/or automatically by an automatic item carrier management system. The remote selection of a route change may be transmitted, such as by a wireless network signal or the like, to the mobile device 110. In other examples, the route change may be identified based on a GPS signal indicating that the item carrier has left the stored route and/or has begun travelling along a different recognized route. In some embodiments, the mobile device 110 may prompt the item carrier when a route discrepancy is identified, permitting the item carrier to select the new route based on the prompt from the mobile device 110.

If a route change is not detected, the method continues to repeat blocks 1715-1725, and terminates at block 1735 after the item carrier completes all of the events along the route or otherwise determines to discontinue the route. If a route change is detected, the method returns to block 1710. At block 1710, the mobile device 110 can retrieve and store additional route information, such as route information corresponding to events along the newly selected route. For example, the mobile device 110 may communicate with remote databases 120 such as the geofence database 121, lock database 122, and/or item information database 124 to obtain the new route information. The item carrier can then complete the delivery and/or pick-events along the new route, eventually terminating at block 1735 after completing the route. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

A person skilled in the art will recognize that each of these sub-systems can be inter-connected and controllably connected using a variety of techniques and hardware and that the present disclosure is not limited to any specific method of connection or connection hardware.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method of operating a lock, the method comprising:

engaging an end of a rack with a locking member to retain a door in a closed position, wherein the rack comprises a plurality of teeth;

rotating, via a motor, a pinion gear, the pinion gear comprising a plurality of teeth;

engaging one or more of the plurality of teeth of the pinion gear with one or more of the plurality of teeth of the rack;

moving the rack in a first direction by the engagement of the one or more teeth of the pinion gear with the one or more of the plurality of teeth of the rack;

disengaging the end of the rack from the locking member;

further rotating the pinion gear to a position where the plurality of teeth of the pinion gear do not engage any of the plurality of teeth of the rack;

contacting, via the teeth of the pinion gear or a cam connected to the pinion gear, a switch proximate the pinion gear;

deactivating the motor in response to contacting the switch; and moving, via a first biasing element, the rack in a second direction.

2. The method of claim 1, further comprising exerting, via a second biasing member, a force against the locking member, wherein exerting a force against the locking member causes the door to open upon the rack disengaging the locking member.

3. The method of claim 1, wherein the switch is located proximate the rack so as to deactivate the motor after the pinion gear reaches an angular orientation at which the teeth of the pinion gear do not engage the teeth of the rack.

4. The method of claim 3, wherein the cam is connected to the pinion gear such that the switch is contacted by the cam when the pinion gear reaches the angular orientation in which the teeth of the pinion gear do not engage the teeth of the rack.

5. The method of claim 1, further comprising transferring, via a power receiver, electrical power to the motor, the power receiver configured to receive electrical power from a wireless power source external to the receptacle.

6. The method of claim 5, further comprising activating, via a processor in communication with the power receiver, the motor based at least in part on receiving and verifying a security credential from a wireless power source in proximity to the power receiver.

7. The method of claim 1, wherein the locking member is positioned on the door.

8. The method of claim 1, wherein the locking member is positioned on a wall of a receptacle.

9. A method of operating a lock, the method comprising:

engaging an end of a rack with a first locking member to retain a door in a closed position, wherein the rack comprises a plurality of teeth;

turning a key in a key lock mechanism, the key lock mechanism coupled to a locking arm, and wherein turning the key in a first direction causes the locking arm to disengage a second locking member;

rotating, via a motor, a pinion gear, the pinion gear comprising a plurality of teeth;

engaging one or more of the plurality of teeth of the pinion gear with one or more of the plurality of teeth of the rack;

moving the rack in a first direction by the engagement of the one or more teeth of the pinion gear with the one or more of the plurality of teeth of the rack;

disengaging the end of the rack from the first locking member;

further rotating the pinion gear to a position where the plurality of teeth of the pinion gear do not engage any of the plurality of teeth of the rack;

moving, via a first biasing element, the rack in a second direction; and turning the key in the key lock mechanism, where turning the key in a second direction causes the locking arm to engage the second locking member of the door of the receptacle to retain the door in a closed position.

10. The method of claim 9, further comprising:

receiving a security credential from a mobile device; and upon receiving the security credential, activating the motor.

11. The method of claim 10, wherein activating the motor further comprises receiving, via a power receiver, electrical power from the mobile device and transferring the electrical power to the motor.

* * * * *